United States Patent
Shigemura et al.

(10) Patent No.: US 8,918,661 B2
(45) Date of Patent: Dec. 23, 2014

(54) METHOD AND APPARATUS FOR ASSIGNING STORAGE RESOURCES TO A POWER SAVING TARGET STORAGE POOL BASED ON EITHER ACCESS FREQUENCY OR POWER CONSUMPTION

(75) Inventors: Takeshi Shigemura, Odawara (JP); Koji Iwamitsu, Odawara (JP)

(73) Assignee: Hitachi, Ltd., Tokyo (JP)

( * ) Notice: Subject to any disclaimer, the term of this patent is extended or adjusted under 35 U.S.C. 154(b) by 977 days.

(21) Appl. No.: 12/743,759

(22) PCT Filed: May 11, 2010

(86) PCT No.: PCT/JP2010/003193
§ 371 (c)(1),
(2), (4) Date: May 19, 2010

(87) PCT Pub. No.: WO2011/141955
PCT Pub. Date: Nov. 17, 2011

(65) Prior Publication Data
US 2011/0283123 A1 Nov. 17, 2011

(51) Int. Cl.
*G06F 1/32* (2006.01)
*G06F 11/16* (2006.01)
*G06F 13/00* (2006.01)
*G06F 3/06* (2006.01)

(52) U.S. Cl.
CPC ............ *G06F 3/0665* (2013.01); *G06F 1/3221* (2013.01); *G06F 3/0625* (2013.01); *G06F 3/0631* (2013.01); *G06F 3/0634* (2013.01); *G06F 3/0683* (2013.01); *Y02B 60/1246* (2013.01)
USPC ........................... 713/320; 714/6.22; 711/114

(58) Field of Classification Search
CPC ... G06F 3/0689; G06F 1/3234; G06F 1/3206; G06F 3/0625; G06F 1/3268; G06F 1/3221; G06F 3/067

USPC ........................... 713/320; 714/6.22; 711/114
See application file for complete search history.

(56) References Cited

U.S. PATENT DOCUMENTS

| 2005/0273638 | A1* | 12/2005 | Kaiju et al. ................... 713/323 |
| 2007/0250679 | A1 | 10/2007 | Umemura et al. |
| 2009/0006876 | A1 | 1/2009 | Fukatani et al. |
| 2009/0119529 | A1* | 5/2009 | Kono et al. ................... 713/324 |
| 2009/0125737 | A1 | 5/2009 | Brey et al. |
| 2009/0313427 | A1* | 12/2009 | Ukai et al. ................... 711/114 |
| 2011/0016336 | A1* | 1/2011 | Mori et al. ................... 713/320 |
| 2011/0208937 | A1* | 8/2011 | Hayashi et al. ............... 711/165 |

FOREIGN PATENT DOCUMENTS

JP 2007-293442 11/2007

* cited by examiner

*Primary Examiner* — Ji H Bae
(74) *Attorney, Agent, or Firm* — Brundidge & Stanger, P.C.

(57) ABSTRACT

The present invention achieves appropriate power saving of the storage systems in accordance with the user's needs. In a storage system 1 including a storage apparatus 10 comprising a thin provisioning function and a management device 20, the management device 20 receives specification of a storage pool 93 as a power saving target and the specification of a power saving mode from a user and, when receiving the specification of prioritizing host access, selects the storage resource (RAID group 92) allocated to the storage pool 93 preferentially in ascending order of access frequency from the host computer 30 until a sum of a reduced amount of power saving exceeds the target value or, when receiving the specification of prioritizing power saving, selects the storage resources allocated to the storage pool 93 preferentially in descending order of power consumption until a sum of a reduced amount of power consumption exceeds a target value, and makes the power saving function of the selected storage resources operate.

14 Claims, 26 Drawing Sheets

Fig. 10

VOLUME MANAGEMENT TABLE 1000

| VOLUME ID | DEVICE ID | VOLUME TYPE | | STORAGE CAPACITY | POOL ID | ALLOCATION DESTINATION |
| --- | --- | --- | --- | --- | --- | --- |
| | | RAID LEVEL | DISK TYPE | | | |
| 00:01 | Storage1 | RAID1 | FC | 10GB | n/a | Host1 |
| 00:02 | Storage1 | RAID1 | FC | 10GB | n/a | Host1 |
| 01:01 | Storage1 | RAID5 | FC | 100GB | n/a | Pool1 |
| 01:02 | Storage1 | RAID5 | FC | 100GB | n/a | Pool1 |
| 01:03 | Storage1 | RAID5 | FC | 100GB | n/a | Pool3 |
| 02:01 | Storage1 | RAID1 | SATA | 25GB | n/a | Pool2 |
| 02:02 | Storage1 | RAID1 | SATA | 25GB | n/a | Pool2 |
| 02:03 | Storage1 | RAID1 | SATA | 25GB | n/a | Pool3 |
| 03:01 | Storage1 | RAID1 | FC | 10GB | n/a | n/a |
| 03:02 | Storage1 | RAID1 | FC | 10GB | n/a | n/a |
| V:00:01 | Storage1 | RAID5 | FC | 100GB | Pool1 | Host2 |
| V:00:02 | Storage1 | RAID5 | FC | 50GB | Pool1 | Host2 |
| V:00:03 | Storage1 | RAID1 | SATA | 20GB | Pool2 | Host3 |
| V:00:04 | Storage1 | RAID1 | SATA | 0GB | Pool2 | n/a |
| V:00:05 | Storage1 | RAID5/RAID1 MIXED | FC/SATA MIXED | 0GB | Pool3 | n/a |
| ... | | | | | | |
| 11:01 | Storage2 | RAID5 | FC | 10GB | n/a | n/a |
| ... | | | | | | |

POOL MANAGEMENT TABLE 1100

| POOL ID | DEVICE ID | VOLUME ID -DEVICE ID | POOL TYPE | MAXIMUM CAPACITY | USED CAPACITY | USAGE RATE | ALERT THRESHOLD |
|---|---|---|---|---|---|---|---|
| Pool1 | Storage1 | 01:01-Storage1<br>01:02-Storage1 | RAID5-FC | 200GB | 150GB | 75% | 90% |
| Pool2 | Storage1 | 02:01-Storage1<br>02:02-Storage1 | RAID1-SATA | 50GB | 10GB | 20% | 90% |
| Pool3 | Storage1 | 01:03-Storage1<br>02:03-Storage1 | RAID5-FC/<br>RAID1-SATA | 125GB | 0GB | 0% | 90% |
| ... | ... | | | | | | |

Fig. 12

RAID GROUP MANAGEMENT TABLE 1200

| RG-ID | POWER CONSUMPTION AMOUNT | TOTAL CAPACITY | USED CAPACITY | ACCESS FREQUENCY | SPIN-DOWN TARGET FLAG | RETRY COUNTER |
|---|---|---|---|---|---|---|
| 0 | 100W | 2.4TB | 10GB | 100 IOPS | 0 | 1 |
| 1 | 100W | 2.4TB | 20GB | 100 IOPS | 1 | 0 |
| 2 | 100W | 2.4TB | 15GB | 1000 IOPS | 0 | 0 |

Fig. 13A

VIRTUAL LU-RG CORRESPONDENCE MANAGEMENT TABLE 1300

| VIRTUAL LUN | RG-ID | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 | .. |
| 0 | 1 | 1 | 1 | 0 | 0 | 0 | 0 | 0 | 0 | 0 | 0 | 0 | .. |
| 1 | 1 | 1 | 1 | 0 | 0 | 0 | 0 | 0 | 0 | 0 | 0 | 0 | .. |
| 2 | 1 | 1 | 1 | 0 | 0 | 0 | 0 | 0 | 0 | 0 | 0 | 0 | .. |
| : | : | : | : | : | : | : | : | : | : | : | : | : | .. |

ROUND-ROBIN TABLE 1400

| VIRTUAL LUN IDENTIFIER | IDENTIFIER OF RAID GROUP AS NEXT WRITE DESTINATION |
|---|---|
| 0 | 1 |
| 1 | 0 |
| : | : |

Fig. 21

VIRTUAL VOLUME MANAGEMENT TABLE 2100

| VIRTUAL LUN (2111) | RETRY COUNTER (2112) | COMPLETION FLAG (2113) |
|---|---|---|
| 0 | 1 | 0 |
| 1 | 0 | 0 |
| 2 | 0 | 0 |
| 3 | 0 | 0 |
| ⋮ | ⋮ | ⋮ |

Fig. 22

DUPLICATION RATIO MANAGEMENT TABLE 2200

| RG-ID (2211) | VIRTUAL LUN (2212) | STORAGE CAPACITY (2213) | ACCESS FREQUENCY (2214) | DUPLICATION RATIO (2215) |
|---|---|---|---|---|
| 0 | 0 | 10GB | 100 IOPS | |
| 0 | 1 | 10GB | 100 IOPS | |
| 0 | 2 | 15GB | 100 IOPS | |
| 1 | 0 | 10GB | 500 IOPS | 2 |
| 1 | 1 | 20GB | 500 IOPS | 3 |
| 1 | 2 | 13GB | 700 IOPS | 1 |
| 2 | 0 | 11GB | 250 IOPS | 1 |
| 2 | 1 | 15GB | 500 IOPS | 4 |
| 2 | 2 | 15GB | 600 IOPS | 1 |

POOL CAPACITY MANAGEMENT TABLE 2600

| POOL ID | TOTAL CAPACITY | USED CAPACITY | USAGE RATE | FIRST THRESHOLD | SECOND THRESHOLD | TOTAL CAPACITY (CONSIDERING POWER SAVING) | USAGE RATE (CONSIDERING POWER SAVING) | AUTOMATIC SPIN-UP FLAG |
|---|---|---|---|---|---|---|---|---|
| 0 | 10TB | 4TB | 40% | 60% | 80% | — | — | ON |
| 1 | 10TB | 4TB | 40% | 50% | 85% | 8TB | 50% | OFF |
| ⋮ | ⋮ | ⋮ | ⋮ | ⋮ | ⋮ | ⋮ | ⋮ | ⋮ |

METHOD AND APPARATUS FOR ASSIGNING STORAGE RESOURCES TO A POWER SAVING TARGET STORAGE POOL BASED ON EITHER ACCESS FREQUENCY OR POWER CONSUMPTION

TECHNICAL FIELD

The present invention relates to a storage apparatus and a control method of a storage system, specifically to a technology for achieving appropriate power saving of the storage system in accordance with the user's needs.

BACKGROUND ART

Patent Literature (PTL) 1 discloses, allocating the storage apparatuses in the pool to virtual volumes in accordance with access from the host to the virtual volumes, powering on the storage apparatuses allocated to the virtual volumes, and powering off the storage apparatuses in preparation status not allocated to the virtual volumes to reduce power consumption of the storage apparatuses allocated to the pool, in a storage system including a structure of providing virtual volumes supplied from a pool configured of a set of storage apparatuses and to which storage apparatuses can be added afterwards to a higher-level devices.

CITATION LIST

Patent Literature

PTL 1: Japanese Patent Application Laid-open Publication No. 2007-293442

SUMMARY OF INVENTION

Technical Problem

Meanwhile, as described above, the effect of reducing power consumption can be expected by controlling power supplies of the storage devices in accordance with whether the storage devices are allocated to the virtual volumes or not, but, the field in which storage systems operate, the needs exist that, in accordance with the characteristics and the like of businesses or services, the property and the like of handled data, elaborate power supply control performed to achieve appropriate power saving of the storage systems in accordance with the respective operation status without lowering the quality of the businesses or the services should be attempted.

The present invention was made in view of the above-mentioned background for the purpose of providing a storage system and a method of controlling storage apparatuses capable of achieving appropriate power saving of the storage systems in accordance with the user's needs.

Solution to Problem

An aspect of the present invention for achieving the above-mentioned objective is a storage apparatus communicatively coupled to a host computer, comprising a plurality of storage resources that have a power saving function; one or more storage pools to which one or more of the storage resources are allocated; and a Thin Provisioning function unit that provides to the host computer a virtual volume provided by the storage pool wherein, the storage apparatus communicatively couples to a management device, the management device receiving specification as a power saving target storage pool that is the storage pool as a target of power saving, receiving specification as prioritizing host access that emphasizes an access performance of the storage apparatus to the host computer, or as prioritizing power saving that prioritizes power saving of the storage apparatus, sending to the storage apparatus an instruction to select, the storage resources allocated to the power saving target storage pool preferentially in ascending order of an access frequency from the host computer, until a sum of a reduced amount of power saving of all the selected storage resource exceeds a target value, and functioning the power saving function of the selected storage resource, when receiving specification as prioritizing host access, sending to the storage apparatus an instruction to select, the storage resource allocated to the power saving target storage pool preferentially in descending order of power consumption, until a sum of a reduced amount of power saving of all the selected storage resource exceeds a target value, and functioning the power saving function of the selected storage resource, when receiving specification as prioritizing power saving, the storage apparatus functioning the power saving function of the selected storage resource according to the instruction.

The other problems and their solutions disclosed in the present specification will be made clear by the description in the Description of Embodiments, figures, and the like.

Advantageous Effects of Invention

According to the present invention, appropriate power saving of the storage system can be achieved in accordance with the user's needs.

BRIEF DESCRIPTION OF DRAWINGS

FIG. 10 is an example of a volume management table 1000.

FIG. 11 is an example of a pool management table 1100.

FIG. 12 is an example of a RAID group management table 1200.

FIG. 13A is an example of a virtual LU-RG correspondence management table 1300.

FIG. 21 is an example of a virtual volume management table 2100.

FIG. 22 is an example of a duplication ratio management table 2200.

DESCRIPTION OF EMBODIMENTS

Figure 1:
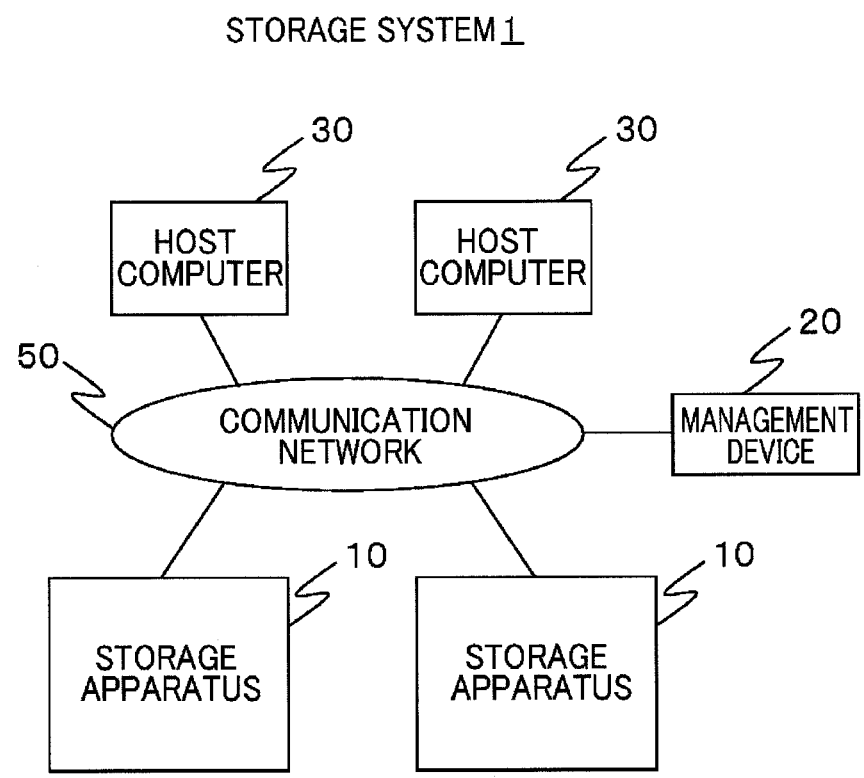
FIG. 1 is a diagram showing a schematic configuration of a storage system 1.

The embodiments of the present invention will be described below with reference to the drawings. FIG. 1 shows a schematic configuration of a storage system 1 described as an embodiment. As shown in FIG. 1, the storage system 1 is configured to include one or more storage apparatuses 10, a management device 20, and one or more host computers 30. These devices are communicatively coupled to each other via a communication network 50.

The communication network 50 is, for example, LAN, SAN (Storage Area Network), the internet, a public telecommunication network and the like. Communication between the host computers 30 and the storage apparatuses 10 is performed using the protocols of TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like.

The host computer 30 is, for example, a mainframe, a personal computer, an office computer, and the like, which is an information processing device (computer) which uses the storage area provided by the storage apparatus 10 as a data storage area. The host computer 30, when accessing the above-mentioned storage area, transmits a data input/output request (hereinafter referred to as a data I/O request) to the storage apparatus 10.

The management device 20 is an information processing device (computer) such as a personal computer, an office computer, or others. The management device 20 is used for setting, monitoring, controlling and the like of the storage system 1. The management device 20 comprises a GUI (Graphic User Interface) and a CLI (Command Line Interface) for the user to perform setting, monitoring, controlling and the like of the storage system 1.

Figure 2:
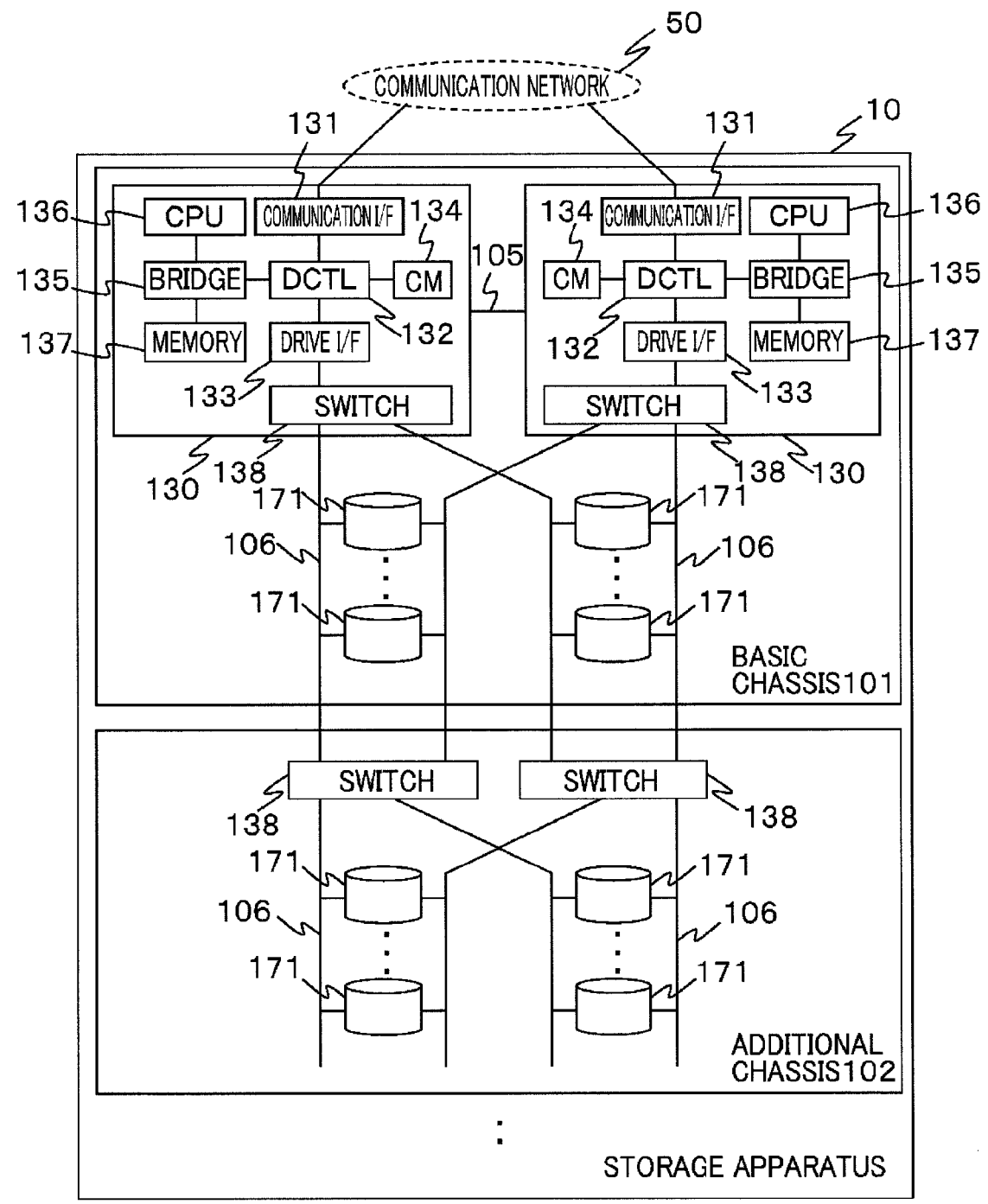
FIG. 2 is a diagram showing the hardware configuration of a storage apparatus 10.

FIG. 2 shows a hardware configuration of the storage apparatus 10. As shown in FIG. 2, the storage apparatus 10 comprises a basic chassis 101 in which a plurality of control boards 130 are made redundant for the purpose of improving reliability, load distribution, and the like are installed and an additional chassis 102 which does not comprise any control boards 130. The control boards 130 installed in the basic chassis 101 comprises a communication I/F 131, a data controller 132 (referred to as a DTCL (DaTa ControLer) in the figure), a drive I/F 133, a cache memory 134 (CM), a bridge 135, a CPU 136, a memory 137, and a switch 138. The control boards 130 configured as redundant are mutually communicatively coupled via an internal bus 105 that complies with the standard such as a PCI express (PCI: Peripheral Component Interconnect).

Storage drives 171 installed in each of the basic chassis 101 and the additional chassis 102 are coupled to the control boards 130 via Fibre Channel loops 106. The storage drives 171 are hard disk drives complying with the specification of, for example, SAS (Serial Attached SCSI), SATA (Serial ATA), FC (Fibre Channel), PATA (Parallel ATA), SCSI (Small Computer System Interface), or and the like or solid state drives (SSDs).

The storage drives 171 provide logical volumes (hereinafter also referred to as LUs (Logical Units, Logical Volumes)) controlled by a method of RAID (Redundant Arrays of Inexpensive (or Independent) Disks) or the like. Note that, in the description below, the identifiers identifying the respective logical volumes are referred to as LUNs (Logical Unit Numbers).

Figure 3:
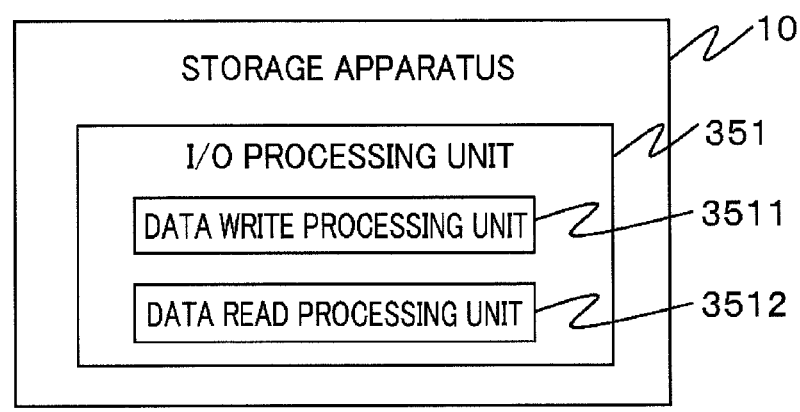
FIG. 3 is a diagram showing the basic functions of the storage apparatus 10.

FIG. 3 shows the basic functions of the storage apparatus 10. As shown in FIG. 3, the storage apparatus 10 has an I/O processing unit 351 including a data write processing unit 3511 and a data read processing unit 3512. The data write processing unit 3511 performs processing related to writing to storage units 17. The data read processing unit 3512 performs processing related to reading from storage units 17.

Note that these functions which the storage apparatus 10 has are realized by the hardware of the control boards 130 in the storage apparatus 10 or the CPU 136 reading and executing the programs stored in the memories 137 or the storage units 17 (e.g. BIOS (Basic Input Output System), firmware, an Operating System (OS: Operating System), and the like).

Figure 4:
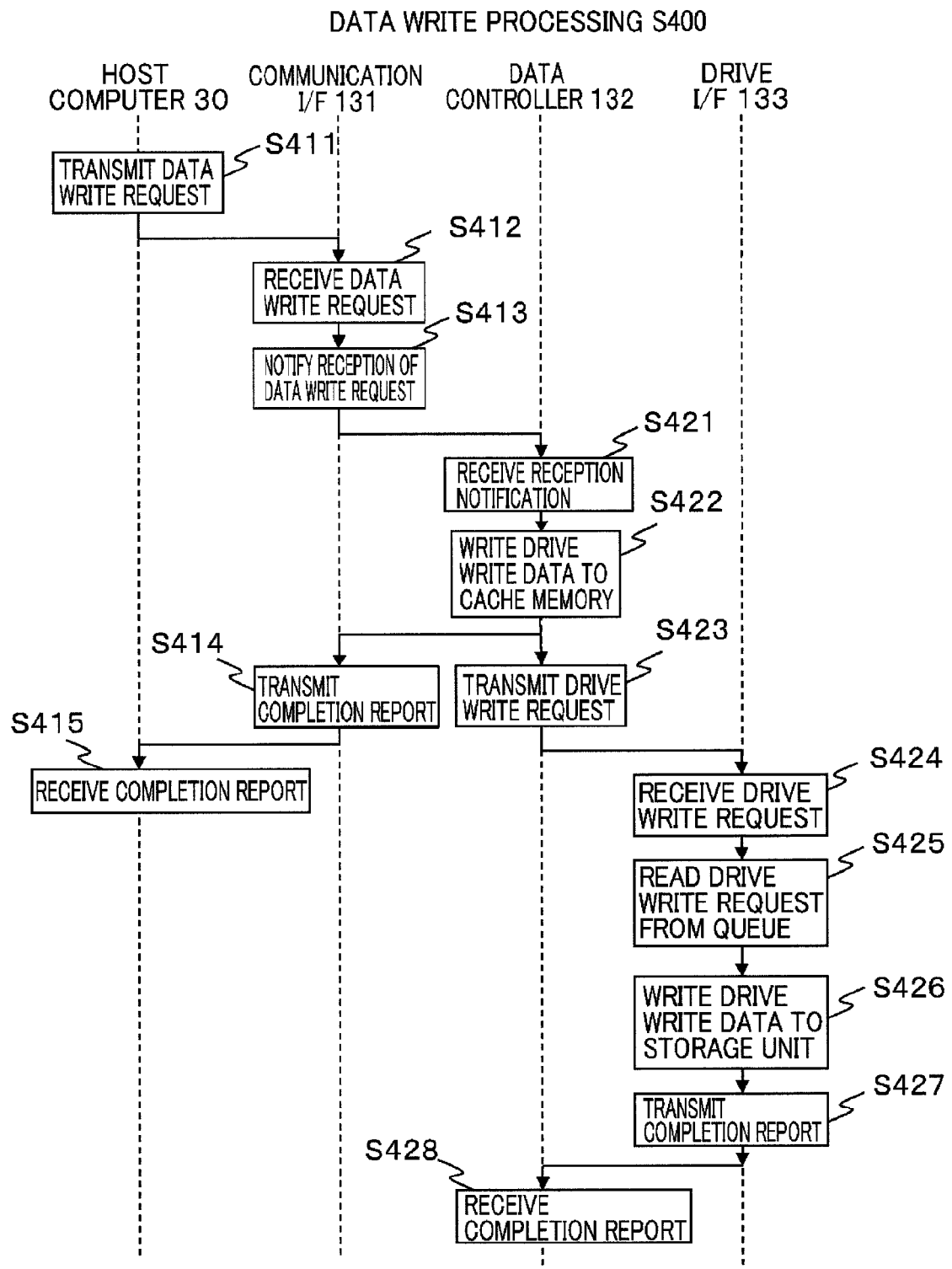
FIG. 4 is a flowchart describing a data write processing S400.

FIG. 4 is a diagram describing the basic operation of the storage apparatus 10, with a flowchart describing the processing (hereinafter referred to as a data write processing S400) performed by the data write processing unit 3511 in the I/O processing unit 351 when the storage apparatus 10 receives from the host computer 30 a frame including a data write request. Hereinafter, the data write processing S400 is described with reference to the FIG. 4. Note that, in the description below, the letter "S" affixed before each numeral indicates step.

The frame transmitted from the host computer 30 is received by the communication I/F 131 of the storage apparatus 10 (S411, S412). The communication I/F 131, upon receiving the frame, notifies such to the data controller 132 and the drive I/F 133 (S413).

The data controller 132, upon receiving the above-mentioned notification from the communication I/F 131 (S421), generates a drive write request based on the data write request in the relevant frame, and stores the generated drive write request in the cache memory 134. Then, the data controller 132 transmits the generated drive write request to the drive I/F 133 (S422, S423). The communication I/F 131 transmits a completion report to the host computer 30 (S414), and the host computer 30 receives the completion report (S415).

The drive I/F 133, upon receiving the drive write request, registers the received drive write request to the write processing queue not shown (S424). The drive I/F 133 reads the drive write request transmitted from the write processing queue as necessary (S425). The drive I/F 133 reads from the cache memory 134 the drive write data specified by the drive write request that was read, and writes the drive write data that was read to the storage drive 171 (S426).

Next, the drive I/F 133 notifies a report (completion report) that the writing of the drive write data for the drive write request is completed to the data controller 132 (S427), and the data controller 132 receives the transmitted completion report (S428).

Figure 5:
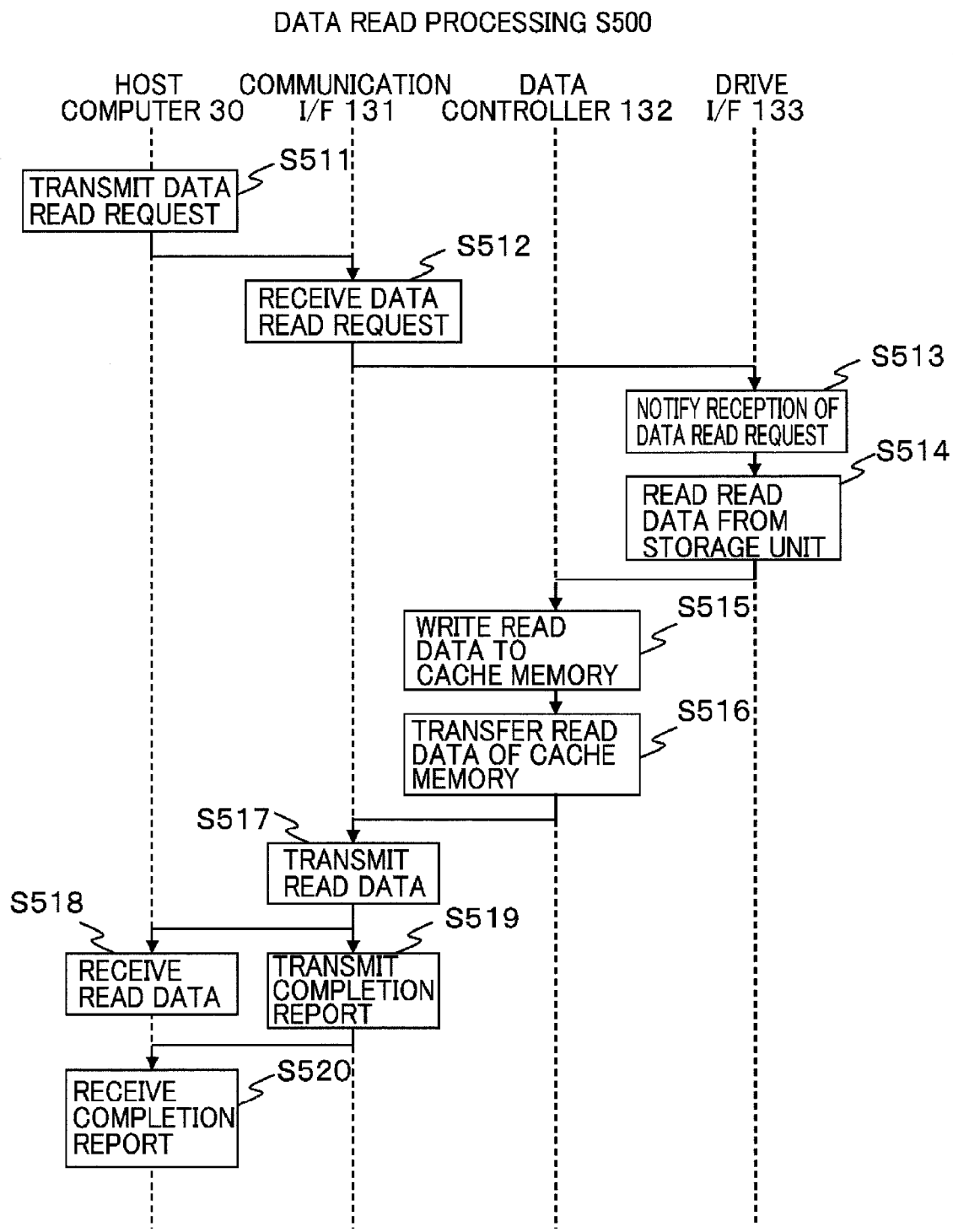
FIG. 5 is a flowchart describing a data read processing S500.

FIG. 5 is a diagram describing a basic operation of the storage apparatus 10, with a flowchart describing the I/O processing (hereinafter referred to as a data read processing S500) performed by the data read processing unit 3512 in the I/O processing unit 351 of the storage apparatus 10 when the storage apparatus 10 receives a frame including a data read request from the host computer 30. Hereinafter, the data read processing S500 is described with reference to FIG. 5.

The frame transmitted from the host computer 30 is received by the communication I/F 131 of the storage apparatus 10 (S511, S512). The communication I/F 131, upon receiving the frame from the host computer 30, notifies such to the data controller 132 and the drive I/F 133 (S513).

The drive I/F 133, upon receiving the above-mentioned notification from the communication I/F 131, reads the data specified by the data read request included in the relevant frame (e.g. specified by an LBA (Logical Block Address)) from the storage unit 17 (storage drive 171) (S514). Note that, when the read data exists in the cache memory 134 (when there is a cache hit), the read processing from the storage unit 17 (S515) is omitted. The data controller 132 writes the data read by the drive I/F 133 to the cache memory 134 (S515). The data controller 132 transfers the data written to the cache memory 134 to the communication I/F 131 as necessary (S516).

The communication I/F 131 sequentially transmits the read data transmitted from the data controller 132 to the host computer 30 (S517, S518). When the transmission of the read data is completed, the communication I/F 131 transmits the completion report to the host computer 30 (S519), and the host computer 30 receives the transmitted completion report (S520).

Figure 6:
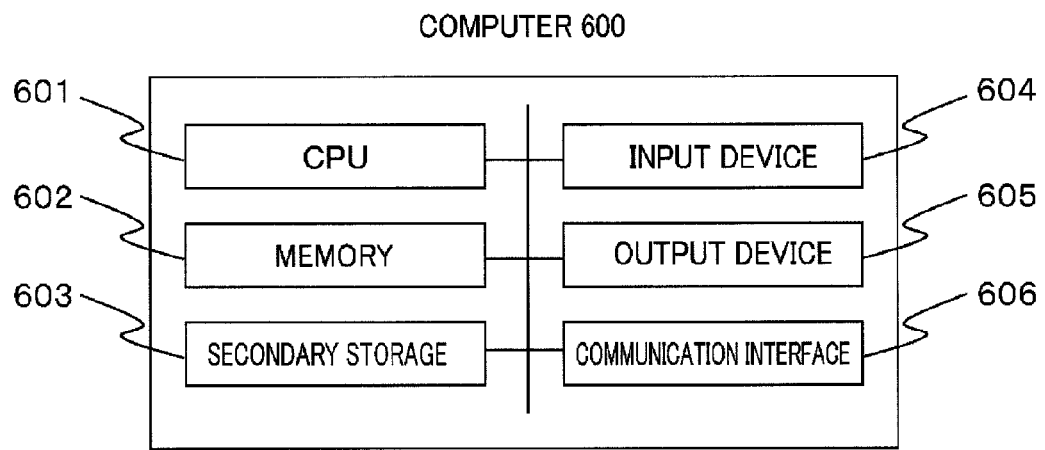
FIG. 6 is an example of the hardware of an information processing device used as a host computer 30 or a management device 20.

FIG. 6 is an example of the hardware of an information processing device used as a host computer 30 or a management device 20. The computer 600 shown in FIG. 6 includes a CPU 601, a memory 602 which is a volatile or non-volatile storage device (e.g. RAM (Random Access Memory) or ROM (Read Only Memory)), an secondary storage 603 (e.g. a hard disk), an input device 604 that receives the user's manual input (e.g. a keyboard or a mouse), an output device 605 (e.g. an LCD monitor), and a communication interface 606 that realizes communication with other devices (e.g. an NIC (Network Interface Card) or an HBA (Host Bus Adapter)). Note that the host computer 30 and the management device 20 may also be configured with a plurality of computers 600 respectively. Furthermore, the management device 20 may also be configured integrally with the storage apparatus 10. Furthermore, the management device 20 may also be a component of the storage apparatus 10.

The host computer 30 uses logical volumes provided by the storage apparatus 10 as data storage areas. In the host computer 30, for example, an application system providing an information processing service to the user and a database management system (DBMS) are realized. The host computer 30 writes the data used by these systems to the storage apparatus 10, or reads the data used by these systems from the storage apparatus 10.

Figure 7:
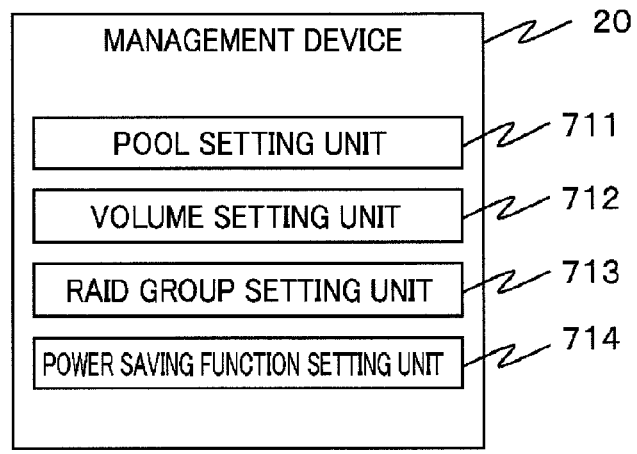
FIG. 7 is a diagram showing the main functions of the management device 20.

FIG. 7 shows the main functions provided to the management device 20. Note that the functions shown in the figure FIG. 7 are realized by the CPU 601 of the management device 20 executing a program read to the memory 602, or by the hardware of the management device 20.

As shown in FIG. 7, the management device 20 includes a pool setting unit 711, a volume setting unit 712, a RAID group setting unit 713, and a power saving function setting unit 714. The pool setting unit 711 manages a storage pool 93 in Thin Provisioning. The pool setting unit 711 transmits a storage pool 93 creation request and a storage pool 93 deletion request to the storage apparatus 10.

The volume setting unit 712 performs the setting of logical volumes (including normal volumes 911 and virtual volumes 912 described later). For example, the volume setting unit 712 appropriately transmits to the storage apparatus 10 a virtual volume 912 creation request or a virtual volume 912 deletion request and a virtual volume 912 allocation request or a virtual volume 912 allocation cancellation request to the host computer 30. The RAID group setting unit 713 performs the setting related to the setting of RAID groups. The power saving function setting unit 714 performs setting related to the power saving function described later.

Figure 8:
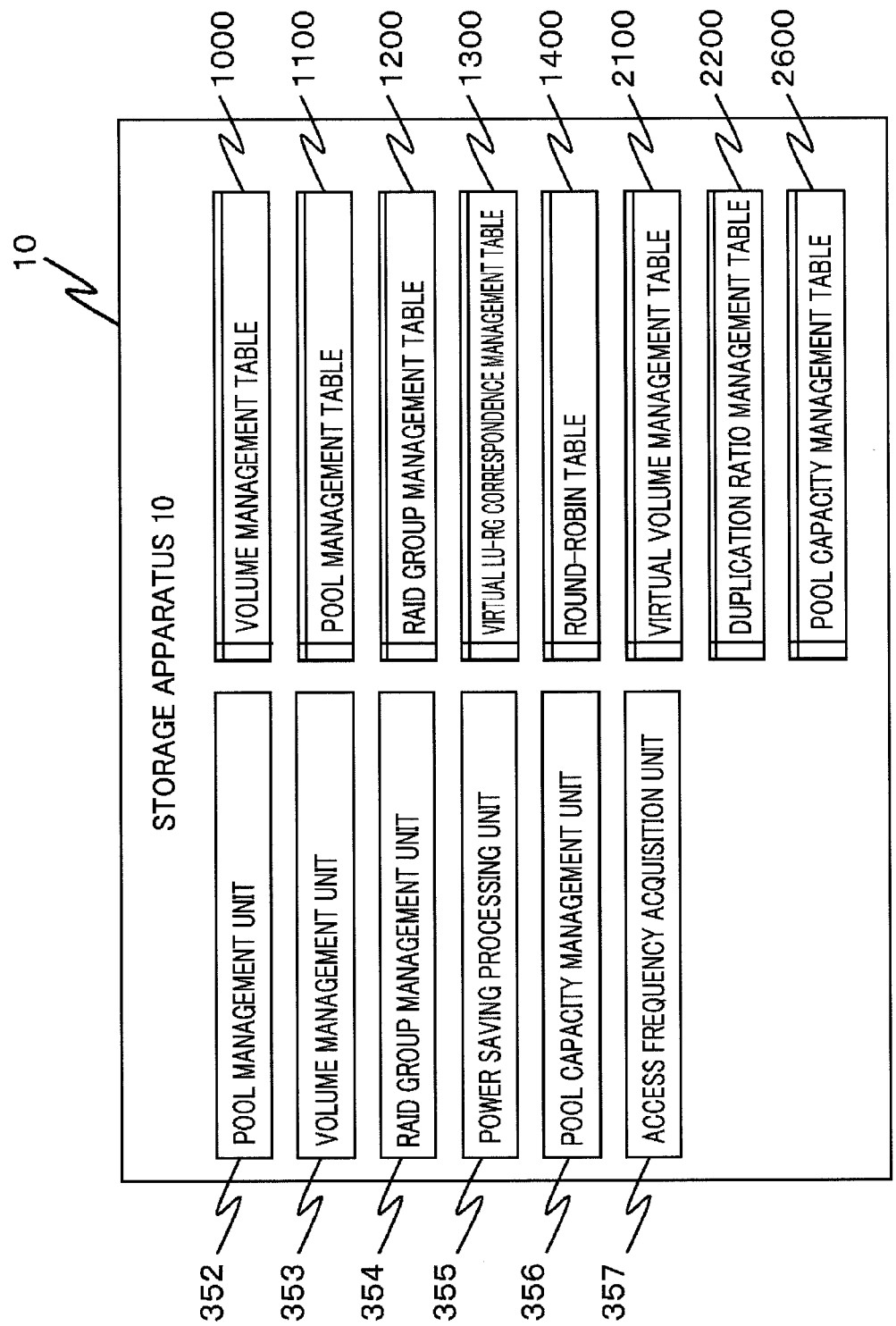
FIG. 8 is a diagram showing the main functions of the storage apparatus 10.

FIG. 8 shows the main functions other than those shown in FIG. 3 which the storage apparatus 10 has and the main data managed in the storage apparatus 10. As shown in FIG. 8, the storage apparatus 10, includes the functions of a pool management unit 352, a volume management unit 353, a RAID group management unit 354, a power saving processing unit 355, a pool capacity management unit 356, and an access frequency acquisition unit 357 in addition to the functions shown in FIG. 3.

The storage pool management unit 352 performs the processing related to the management of storage pools 93. The volume management unit 353 performs processing related to management of logical volumes (including normal volumes 911 and virtual volumes 912 described later). The RAID group management unit 354 performs processing related to management of RAID groups 92. The power saving processing unit 355 performs processing related to power saving described later in the storage apparatus 10. The pool capacity management unit 356 performs processing related to maintenance of the pool capacity. The access frequency acquisition unit 357 performs processing related to acquisition of the access frequency.

Furthermore, as shown in FIG. 8, the storage apparatus 10 manages a volume management table 1000, a pool management table 1100, a RAID group management table 1200, a virtual LU-RG correspondence management table 1300, a round-robin table 1400, a virtual volume management table 2100, a duplication ratio management table 2200, and a pool capacity management table 2600. The management device 20 can acquire the contents of these tables included in the storage apparatus 10 as necessary. Details of these tables are to be described later.

Figure 9:
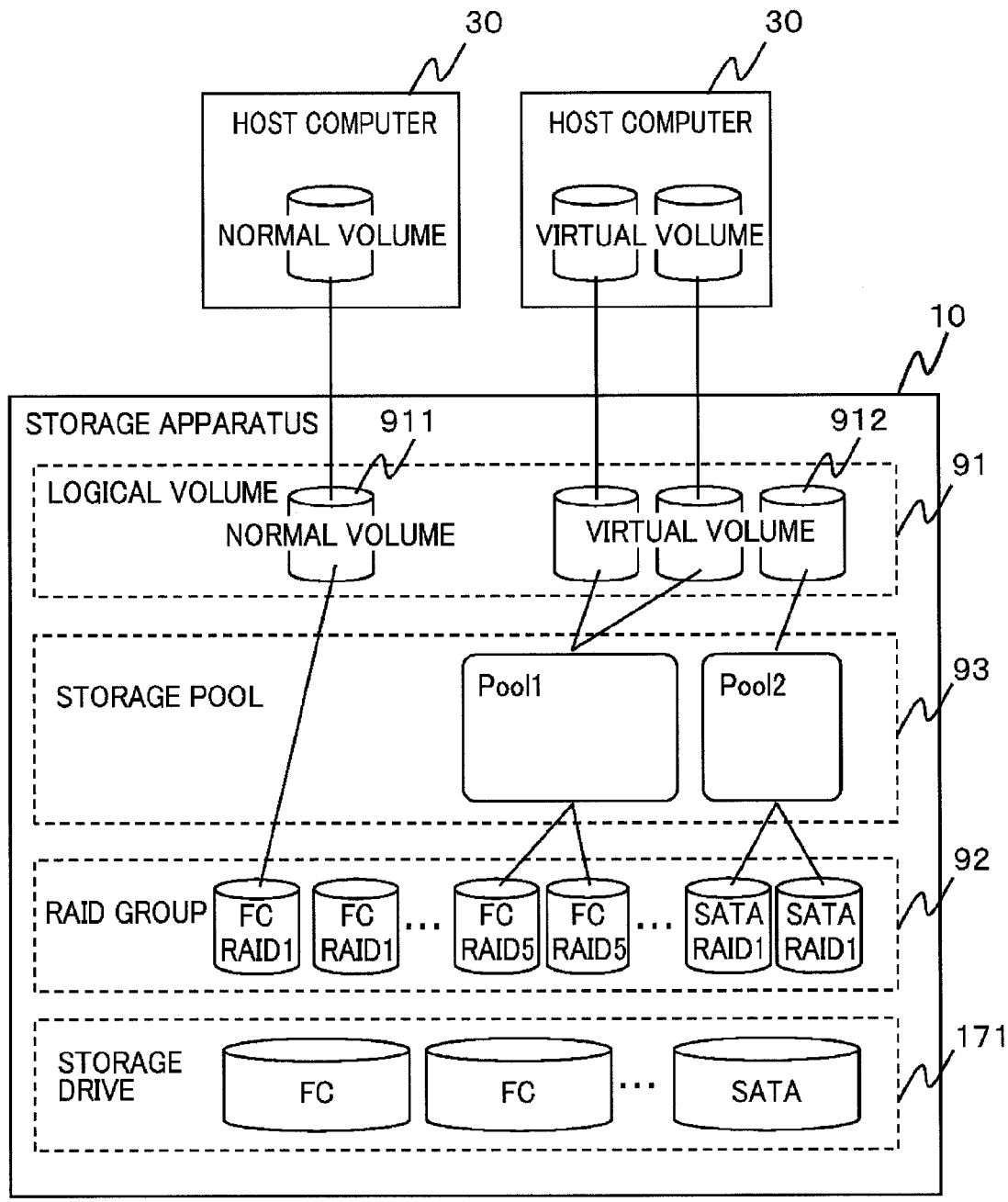
FIG. 9 is a diagram explaining the configuration in which the storage resources are supplied from the storage apparatus 10 to the host computers 30.

FIG. 9 is a diagram describing the supply configuration of storage resources from the storage apparatus 10 to the host computers 30. The storage apparatus 10 provides logical volumes 91 to the host computer 30. The host computer 30 can specify the LUNs (Logical Unit Numbers) which are the identifiers of the logical volumes 91 and access the storage resources of the storage apparatus 10.

In the storage apparatus 10, RAID groups 92 (Redundant Array of Inexpensive (or Independent) Disks) are organized of storage drives 171. The management device 20 and the storage apparatus 10 give an identifier to each RAID group 92, and manage the attributes of each RAID (e.g. the RAID level, the types and the model numbers of the storage drives 171 configuring the RAID groups 92, the configuration, the performance and the reliability of each RAID group 92).

The logical volumes which the storage apparatus 10 provides to the host computers 30 are classified into normal volumes 911 which are logical volumes 91 directly allocated to RAID groups 92 and virtual volumes 912 which are logical volumes 91 indirectly provided as storage resources by RAID groups 92 via storage pools 93. While the RAID groups 92 are statically allocated to the normal volumes 911, the RAID groups 92 are dynamically allocated to the virtual volumes 912 via the storage pools 93.

In the Thin Provisioning method, virtual volumes 912 of an arbitrary capacity and attribute to the host computers 30 can be set without depending on the amount or the attributes of the storage resources which the storage apparatus 10 can currently provide. By adopting the Thin Provisioning method, flexible operation patterns can be realized such as, when the capacity expansion or the performance improvement is actually required due to the change of the usage status of the storage area, new needs or other reasons arise, supplying the storage resources of an amount and quality which comply with the needs. According to this, the design simplification of the storage system 1 or a data center can be attempted. The improvement of the operation efficiency of the storage system 1 such as reducing the initial installation cost of the storage system 1, prompt supply of latest equipments, reduction of the operation cost of drive power, cooling facilities and others can be attempted.

The storage apparatus 10, in accordance with requests from the management device 20, configures virtual volumes 912 with a specific storage pool 93 as a creation source. Furthermore, the storage apparatus 10 allocates virtual volumes 912 to the host computers 30 in accordance with requests from the management device 20. Note that, the information (identifiers) for identifying the virtual volumes 912 of the access destination when the host computers 30 access the virtual volumes 912 are given to virtual volumes 912. Furthermore, when write occurs to the address to which no RAID group 92 is allocated among the virtual volumes 912, the storage apparatus 10 newly allocates the storage area of a part of the RAID groups 92 for the address.

FIG. 10 shows an example of the volume management table 1000. In the volume management table 1000, information related to logical volumes 91 (normal volumes 911 and virtual volumes 912) is managed. As shown in FIG. 10, the volume management table 1000 has a plurality of records each configured of items of a volume ID 1011, a device ID 1012, a volume type 1013, a storage capacity 1014, a pool ID 1015, and an allocation destination 1016.

For the volume ID 1011, an identifier (hereinafter referred to as a volume ID) specifying a normal volume 911 or a virtual volume 912 is set. When the record is related to a normal volume 911, a normal LUN which is an identifier given to each normal volume 911 is set for the volume ID 1011 while, when it is related to a virtual volume 912, a virtual LUN which is an identifier given to each virtual volume 912 is set.

For the device ID 1012, an identifier of the storage apparatus 10 (hereinafter referred to as a storage ID) which provides a normal volume 911 or a virtual volume 912 is set. As a storage ID, for example, a combination of an identifier which the user has registered, a model number and a model name of the storage apparatus 10, and an IP address given to the storage apparatus 10 and others are used.

The volume type 1013 includes the respective items of a RAID level 10131 and a disk type 10132. Among these, for the RAID level 10131, the RAID level of the storage drives 171 configuring the normal volume 911 or the virtual volume 912 is set. Note that, in case of the virtual volume 912, the RAID level of the RAID groups 92 configuring the storage pool 93 which is the source of supplying the virtual volume 912 is set.

For the disk type 10132, the information indicating the type of the storage drives 171 which provide the storage area of the normal volume 911 or the virtual volume 912 is set. In the case of a normal volume 911, the information indicating the type of the storage drives 171 configuring the normal volume 911 is set while, in the case of a virtual volume 912, the information showing the type of the storage drives 171 configuring the RAID groups 92 configuring the storage pool 93 which is the source of supplying the virtual volume 912 is set.

For the storage capacity 1014, the storage capacity of the normal volume 911 or the virtual volume 912 is set. In the case of a normal volume 911, the storage capacity of the normal volume 911 is set. In the case of a virtual volume 912, the storage capacity provided from the storage pool 93 to be allocated to the virtual volume 912 is set.

For the pool ID 1015, if the record is a record of a virtual volume 912, the identifier of the storage pool 93 to which the virtual volume 912 belongs (hereinafter referred to as a pool ID) is set. Note that, if the record is a record of a normal volume 911, an invalid value, for example, "n/a," is set for the relevant field.

For the allocation destination 1016, the information indicating the allocation destination of the normal volume 911 or the virtual volume 912 is set. In the case of the virtual volume 912, the identifier (hereinafter referred to as a host ID) of the host computer 30 as the allocation destination is set. Meanwhile, in the case of the normal volume 911, the host ID of the host computer 30 as the allocation or the pool ID of the storage pool 93 using the relevant normal volume 911 is set. In the case of an unallocated logical volume 91, for the allocation destination 1016, an invalid value such as "n/a" is set.

FIG. 11 is an example of the pool management table 1100. In the pool management table 1100, information related to storage pools 93 is managed. As shown in FIG. 11, the pool management table 1100 includes one or more records each configured of the items of a pool ID 1121, a device ID 1122, a volume ID-device ID 1123, a pool type 1124, a maximum capacity 1125, a used amount 1126, a usage rate 1127, and an alert threshold 1128.

For the pool ID 1121, the above-mentioned pool ID is set. The pool ID is automatically numbered, for example, when a storage pool 93 is created. For the device ID 1122, the storage ID of the storage apparatus 10 providing the storage pool 93 is set. For the volume ID-device ID 1123, the concatenated values of the IDs of the RAID groups 92 (hereinafter referred to as RG-ID) configuring the storage pool 93 and the storage ID of the storage apparatus 10 to which the RAID groups 92 belong are set.

For the pool type 1124, the information indicating the types of the RAID groups 92 configuring the storage pool 93 is set. When the RAID groups 92 configuring the storage pool 93 are of one type, the type of the RAID groups 92 is linked by a sign "–" and set. For example, if the RAID groups 92 configuring the storage pool 93 are "RAID5" and "FC," "RAID1-FC" is set. Meanwhile, when the RAID groups 92 configuring the storage pool 93 are of a plurality of types, all the types of the respective RAID groups 92 are set. For example, the storage pool 93 is configured of the RAID groups 92 of "RAID5" and "FC" and the RAID groups 92 of "RAID1" and "SATA," the value of "RAID5-FC/RAID1-SATA" is set.

For the maximum capacity 1125, the maximum storage capacity of the virtual volume 912 that can be supplied by the storage pool 93 is set. When the storage pool 93 is configured of a plurality of RAID groups 92, the sum of the storage capacities of the respective RAID groups 92 configuring the storage pool 93 is set. For the used amount 1126 (already allocated amount), among the RAID groups 92 configuring the storage pool 93, the sum of the capacities of the storage areas to which data is already written is set.

For the usage rate 1127 (already allocated rate), the rate of the current used capacity to the maximum storage capacity of the storage pool 93 is set. For the usage rate 1127, for example, the value such as used capacity/maximum storage capacity*100(%) is set. For the alert threshold 1128, the threshold is set which is referred to for determining whether the usage rate of the storage pool 93 has increased to a degree that there is a risk that the capacity of the virtual volume 912 cannot be expanded. When the value of the used amount 1126 exceeds the threshold, the management device 20, outputs an alert and prompts the user to expand the capacity of the storage pool 93, perform the migration of the virtual volume 912, and the like.

When a storage pool 93 is created in the storage apparatus 10, the pool management unit 352 of the storage apparatus 10 adds a new record to the pool management table 1100. Meanwhile, when a storage pool 93 is deleted, the pool management unit 352 deletes the relevant record from the pool management table 1100. Furthermore, when a new RAID group 92 is added to a specific storage pool 93 as a component of the storage pool 93, the pool management unit 352 sets the information related to the added RAID group 92 to the volume ID-device ID 1123 of the relevant storage pool 93 of the volume management table 1000. Furthermore, the pool management unit 352 adds the storage capacity of the added RAID group 92 to the maximum storage capacity 1125 and resets the recalculated value for the usage rate 1127. When the volume type 1013 of the added RAID group 92 is not included in the pool type 1124 of the relevant storage pool 93, the pool management unit 352 adds the volume type 1013 of the added RAID group 92 to the pool type 1124. On the other hand, when a RAID group 92 is deleted from the storage pool 93, the pool management unit 352 performs the opposite processing from the case of addition and updates the contents of the pool management table 1100 correctly.

FIG. 12 is an example of the RAID group management table 1200 managed in the storage apparatus 10. In the RAID group management table 1200, information related to the RAID groups 92 provided by the storage apparatus 10 is managed. As shown in FIG. 12, the RAID group management table 1200 includes one or more records each configured of the items of an RG-ID 1211, a power consumption amount 1212, a total capacity 1213, a used capacity 1214, an access frequency 1215, a spin-down target flag 1216, and a retry counter 1217.

An RG-ID is set to the RG-ID 1211. For the power consumption amount 1212, the current power consumption amount of the RAID group 92 is set. For the total capacity 1213, the total capacity of the RAID group 92 is set. For the used capacity 1214, the currently used capacity of the RAID group 92 is set. For the access frequency 1215, the current access frequency of the RAID group 92 is set. For the spin-down target flag 1216, "1" is set if the RAID group 92 is currently the spin-down target while "0" is set if the RAID group 92 is not the spin-down target. The details of the spin-down target flag 1216 and the retry counter 1217 are described later.

As described above, each virtual volume 912 is made to correspond to one or more RAID groups 92 (refer to the volume management table 1000 illustrated in FIG. 10). The data written to a specific virtual volume 912 is stored in one or more RAID groups 92 made to correspond to the virtual volume 912. Though there are various types of technologies for storing each of the one or more RAID groups 92 made to correspond to the virtual volume 912, this embodiment assumes that the data of the virtual volume 912 is stored by the round-robin method, that is, stored and managed in equal and specified order, to the RAID groups 92 made to correspond to the virtual volume 912.

FIG. 13A is an example of a virtual LU-RG correspondence management table 1300. In the virtual LU-RG correspondence management table 1300, correspondence between virtual volumes 912 and RAID groups 92 is managed. In FIG. 13A, for the code 1311, an RG-ID is set. A virtual LUN is set to the code 1312. A flag indicating whether the virtual volume 912 uses the RAID group 92 or not is set to the code 1313 ("1" is set if the RAID group 92 is used while "0" is set if the RAID group 92 is not used).

Figures 13B, 14:
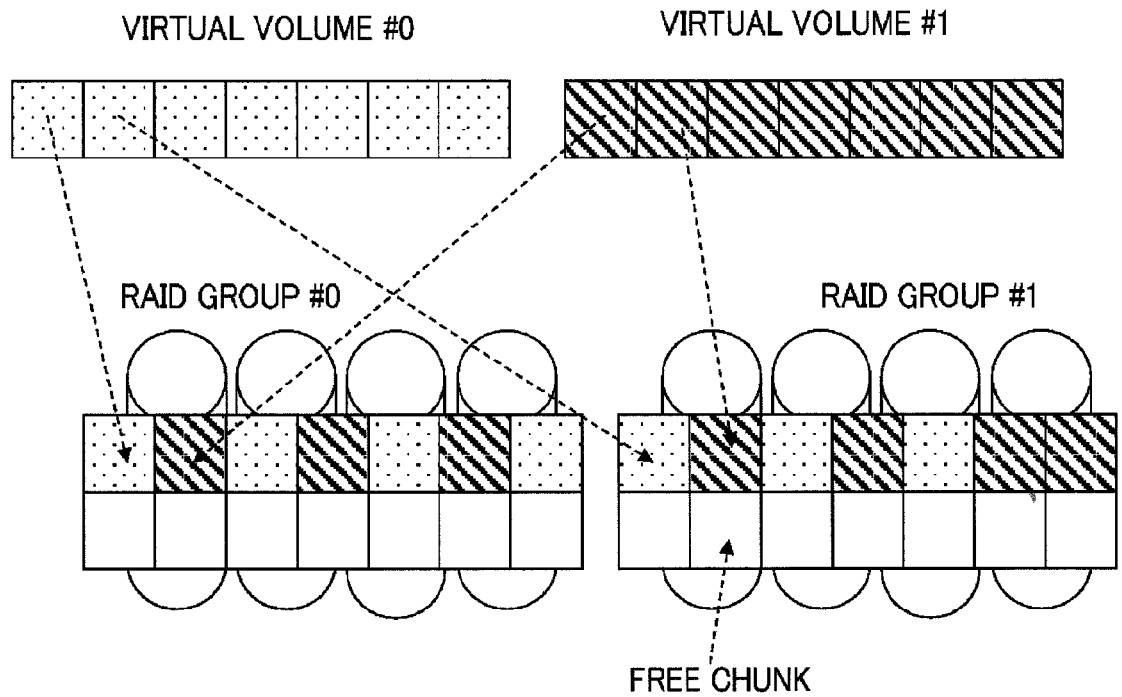
FIG. 13B is a schematic diagram describing the process in which data written to virtual volumes 912 is stored in RAID groups 92 by the round-robin method.
FIG. 14 is an example of a round-robin table 1400.

FIG. 13B is a schematic diagram describing the manner in which data written to virtual volumes 912 is stored in RAID groups 92 by the round-robin method. FIG. 13B shows an example in which two virtual volumes 912 (a virtual volume 912 whose virtual LUN is "#0" and a virtual volume 912 whose virtual LUN is "#1") are respectively made to correspond to two RAID groups 92 (an RAID group 92 whose RG-ID is "#0" and an RAID group 92 whose RG-ID is "#1").

As shown in FIG. 13B, fragments of a plurality of virtual volumes 912 (hereinafter referred to as chunks) are stored in one RAID group 92. In the present embodiment, the capacity of each chunk (the data size) is all equal. The storage apparatus 10 manages the information indicating for which virtual volume 912 each chunk stored in each RAID group 92 is, and to which position (address) of the virtual volume 912 each chunk corresponds.

FIG. 14 is an example of a round-robin table 1400 managed by the storage apparatus 10. For each virtual volume 912, the identifier (RG-ID) of the RAID group 92 to be the write destination when writing to the virtual volume 912 occurs is stored in the round-robin table 1400.

Figure 15:
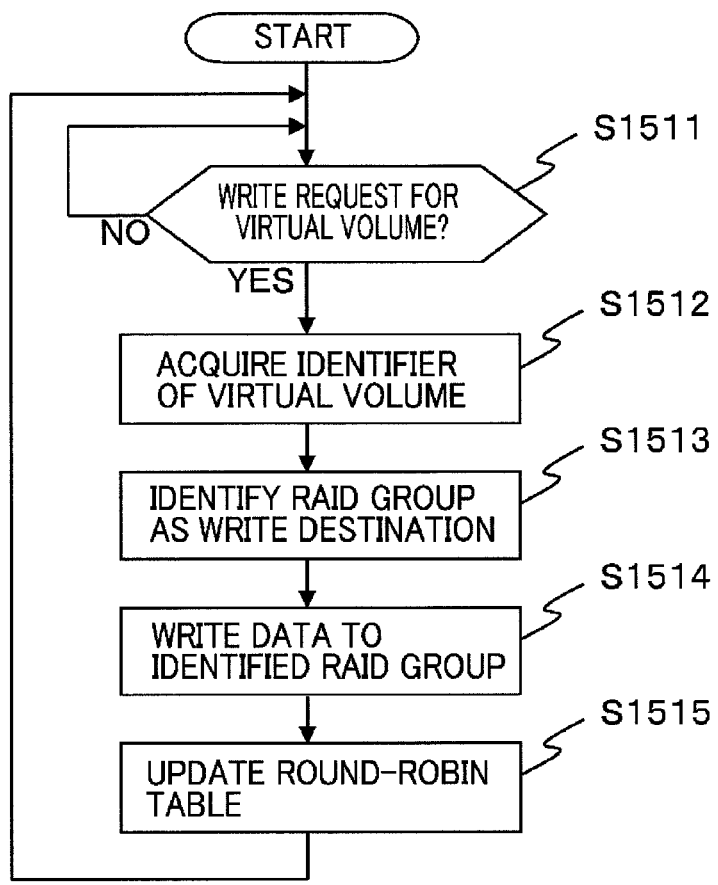
FIG. 15 is a flowchart describing a virtual volume write processing S1500.

FIG. 15 is a flowchart describing the processing related to data writing to a RAID group 92 by the storage apparatus 10 (hereinafter referred to as the virtual volume write processing S1500) when a data write request for a virtual volume 912 occurs.

The storage apparatus 10 monitors in real time whether a data write request for a virtual volume 912 has occurred or not (S1511). If a data write request for a virtual volume 912 occurs (S1511: YES), the storage apparatus 10 acquires the identifier of the virtual volume 912 to be the write destination specified by the write request (S1512). Next, the storage apparatus 10 refers to the round-robin table 1400, acquires the identifier of the RAID group 92 made to correspond to the identifier of the acquired virtual volume 912 (S1513). Then, the storage apparatus 10 writes the data to the identified RAID group 92 (S1514), and updates the contents of the round-robin table 1400 (code 812) of the RAID group 92 which was written this time in accordance with the round-robin method (S1515). After that, the process returns to S1511.

The storage apparatus 10 includes a function of reducing power consumption during the operation of the storage apparatus 10 by using the power saving function which storage devices 171 have (hereinafter referred to as the power saving function). The power saving function which the storage devices 171 have is, for example, the spin-down function which a hard disk drive has (the function of reducing power consumption by energizing only I/O with the higher-level devices to the current-carrying status and stopping the revolution of the motor driving the disk), but the power saving function which the storage devices 171 has is not necessarily limited to this.

A description of an example below is given, assuming that the power saving function which the storage devices 171 have is the spin-down function. Furthermore, in the description below, spinning down a RAID group 92 indicates spinning down one or more of the storage devices 171 configuring the RAID group 92.

The storage apparatus 10, as the above-mentioned power saving function, has the function of spinning down a specific storage device 171 in accordance with an instruction from the management device 20. The user can set the power saving function of the storage apparatus 10 by specifying a storage pool 93 via the management device 20.

Figure 16A:
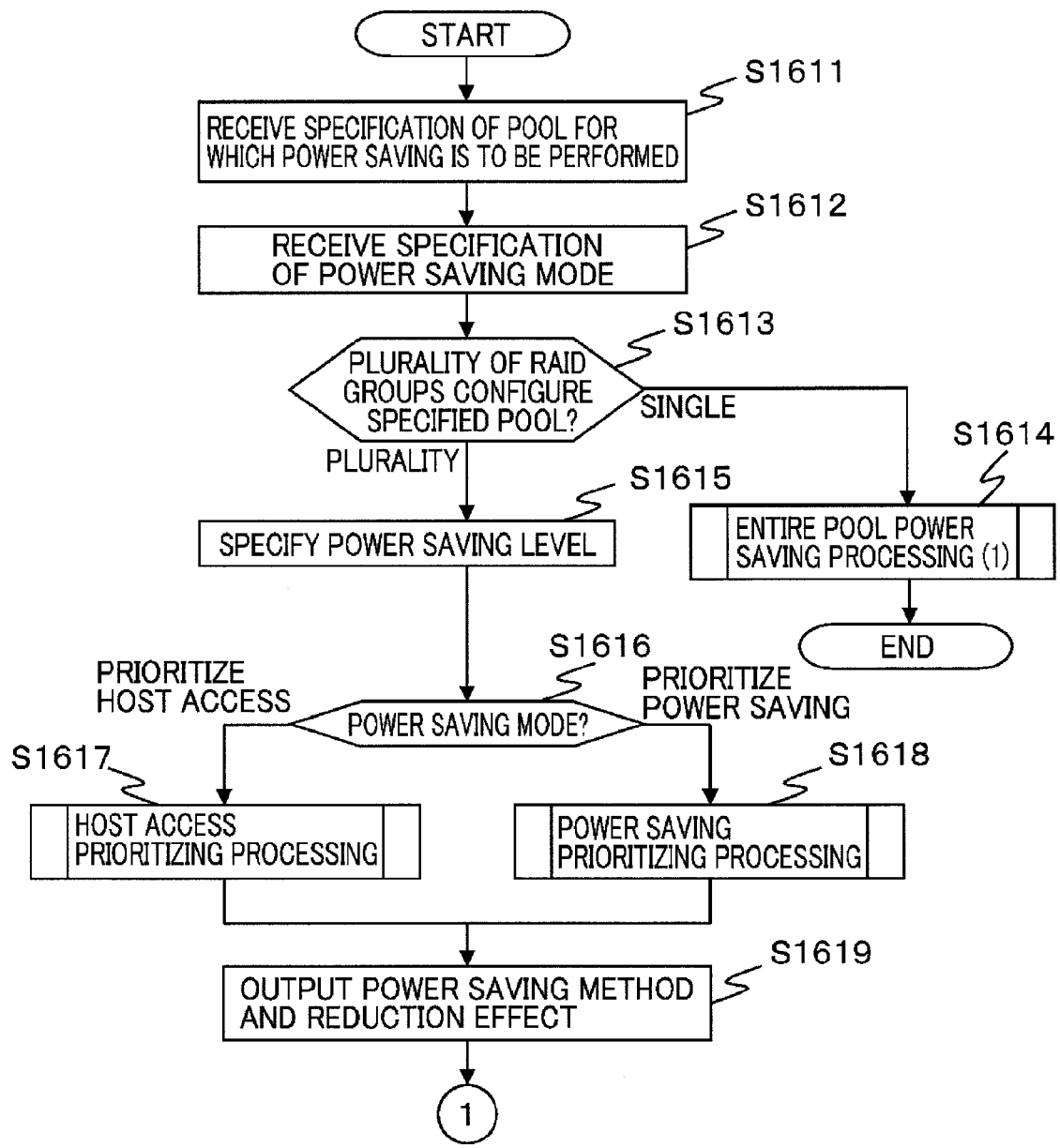
FIG. 16A is a flowchart describing a power saving processing (pool specification) S1600.
Figure 16B:
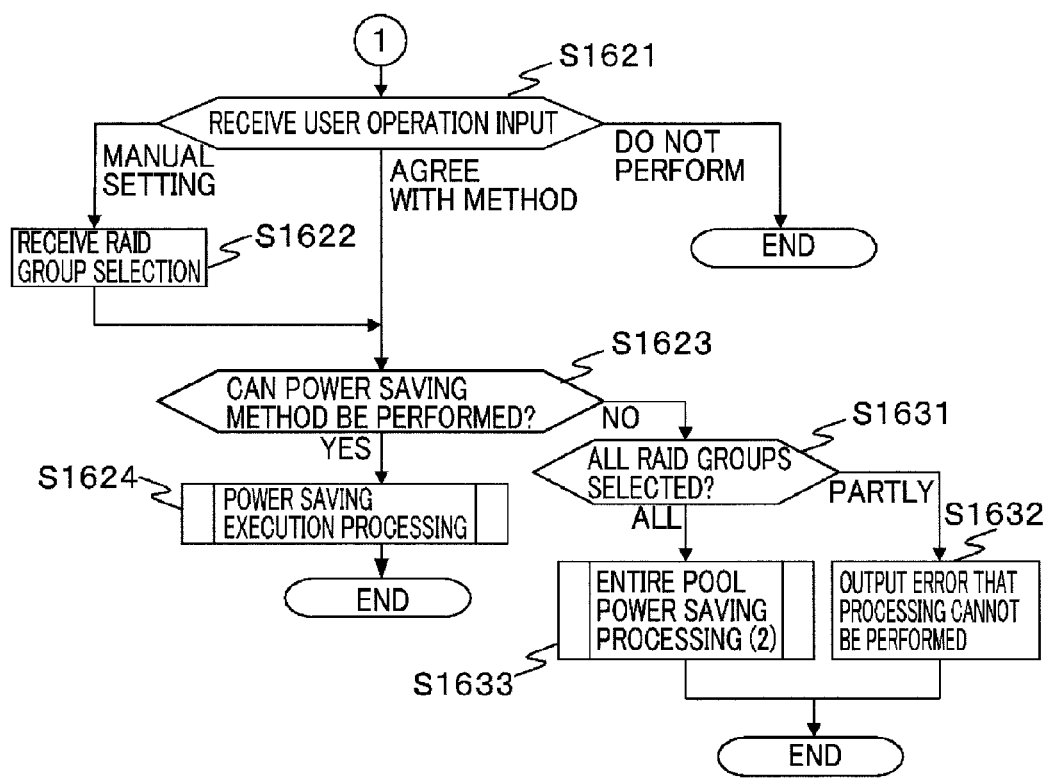
FIG. 16B is a flowchart describing the power saving processing (pool specification) S1600.

FIG. 16A and FIG. 16B are the flowcharts describing the processing performed in the storage system 1 with regard to the setting and the performance of the power saving function which the user performs by specifying a specific storage pool 93 (hereinafter referred to as the power saving processing (pool specification) S1600). Hereinafter, with reference to FIG. 16A and FIG. 16B, the power saving processing (pool specification) S1600 is described.

Firstly, the management device 20 receives a specification of a storage pool 93 from the user (S1611). Next, the management device 20 receives a specification of a power saving mode which is the method for realizing the power saving function for the storage apparatus 10 from the user (S1612). The user can specify either "prioritize host access" or "prioritize power saving" as the above-mentioned power saving mode.

Next, the management device 20 refers to the volume management table 1000 and determines whether the number of RAID group(s) 92 configuring the specified storage pool 93 (providing storage areas to the relevant storage pool 93) is a plurality or not (S1613). When the number of RAID group(s) 92 configuring the specified storage pool 93 is single (S1613: single), the process proceeds to S1614 and, when the number is plural (S1613: plurality), proceeds to S1615.

At S1614, the management device 20 transmits to the storage apparatus 10 an instruction for performing power saving for the entire storage pool 93, and the storage apparatus 10, in accordance with the instruction from the management device 20, performs the power saving processing for the entire storage pool 93 (spinning down all the RAID groups 92 configuring the storage pool 93 specified at S1611) (hereinafter referred to as the entire pool power saving processing (1) S1614). The details of the entire pool power saving processing (1) S1614 are described later.

At S1615, the management device 20 receives a specification of the power saving level (power supply effect) from the user and, in accordance with the received power saving level, sets the target value used in the processing described later. The user, as the above-mentioned power saving level, selects and inputs any of "emphasize power saving," "emphasize balance," or "emphasize performance." As described below, the storage apparatus 10, in accordance with the specified power saving level, performs power saving for the storage apparatus 10. For example, the storage apparatus 10 reduces the power consumption by 80 percent (target value: 80 percent) from the current power consumption (time average) if the user specifies "emphasize power saving," reduces the power consumption by 50 percent (target value: 50 percent) from the current power consumption (time average) if the user specifies "emphasize balance," and reduces the power consumption by 20 percent (target value: 20 percent) from the current power consumption (time average) if the user specifies "emphasize performance."

Next, the management device 20 determines the contents of the power saving mode specified at S1612 (S1616). When "prioritize host access" is specified as the power saving mode (S1616: prioritize host access), the process proceeds to S1617 and, when "prioritize power saving" is specified as the power saving mode (S1616: prioritize power saving), the process proceeds to S1618.

At S1617, the management device 20 performs the power saving method (which RAID group 92 to spin down) when of prioritizing the access performance from the host computer 30 and the processing of generating the reduced amount of power consumption (hereinafter referred to as the host access prioritizing processing S1617) in accordance with the method.

At S1618, the management device 20 executes the power saving method in the case of prioritizing power saving and the processing of generating the reduced amount of power consumption (hereinafter referred to as the power saving prioritizing processing S1618) in accordance with the method. These types of processing are described later. At S1619, the management device 20 outputs the result of the host access prioritizing processing S1617 or the power saving prioritizing processing S1618 (a power saving method and the reduced amount of power consumption by the same). Thereafter, the process proceeds to S1621 in FIG. 16B.

At S1621 in FIG. 16B, the management device 20 receives an instruction from the user with regard to whether to perform the power saving method output at S1619 or not and whether to perform the manual setting by the user themselves. If the user instructs the "manual setting" (S1621: manual setting), the process proceeds to S1622. If the user instructs to "agree with the method" (S1621: agree with method), the process proceeds to S1623. If the user instructs "not to perform the method" (S1621: do not perform), the processing is completed.

At S1622, the management device 20 outputs a list of RAID groups 92 configuring the storage pool 93 specified at S1611 and receives the specification of the RAID groups 92 to be spun down from the user. Then, the process proceeds to S1623.

Note that, at the time of this reception, it may also be permitted to output the screen on which the RAID groups 92 which the management device 20 has selected by the host access prioritizing processing S1617 and the power saving prioritizing processing are selected by default, and to receive any change by the user on the default contents. This saves the user from taking the trouble to select all from the beginning, and the user can select RAID groups 92 in a more preferable manner with reference to the default value.

At S1623, the management device 20 refers to the RAID group management table 1200 and determines whether the power saving method output at S1619 or the power saving method of spinning down the RAID group 92 manually specified at S1622 can be performed or not. If determining that the method can be performed (S1623: YES), the process proceeds to S1624 while, if determining that the method cannot be performed (S1623: NO), proceeds to S1631.

The above-mentioned determination whether the method can be performed or not is performed by checking whether or not the data stored in the RAID groups 92 as the spin-down target can be duplicated to other RAID groups 92 which are not the spin-down target. Furthermore, in this case, whether the method can be performed or not is determined with reference to the conditions, for example, whether there are enough free areas in the duplication destination RAID groups 92 or not and whether or not the performance (e.g. the access performance) of the duplication destination RAID groups 92 is equal to (or within the allowable range of) or higher than the duplication source RAID groups.

At S1624, in response to the instruction from the management device 20, the storage apparatus 10 executes the power saving processing for the storage apparatus 10 (hereinafter referred to as the power saving execution processing S1624) in accordance with the power saving method output at S1619 or the power saving method by spinning down the RAID group 92 manually specified at S1622. The details of the power saving execution processing S1624 are described later.

At S1631, the management device 20 determines whether or not all the RAID groups 92 configuring the storage pool 93 specified at S1611 are selected as the spin-down target. When only a part of the RAID groups 92 are selected (S1631: partly), the management device 20 outputs a message that the power saving method cannot be performed (S1632). Meanwhile, when all the RAID groups 92 are selected (S1631: all), the process proceeds to S1633.

At S1633, the management device 20 gives an instruction for power saving to the storage apparatus 10, and the storage apparatus 10, in accordance with the instruction from the management device 20, executes the power saving processing for the entire storage pool 93 (spinning down all the RAID groups 92 configuring the storage pool 93 specified at S1611) (hereinafter referred to as the entire pool power saving processing (2) S1633). The details of the entire pool power saving processing (2) S1633 are described later.

Figure 17:
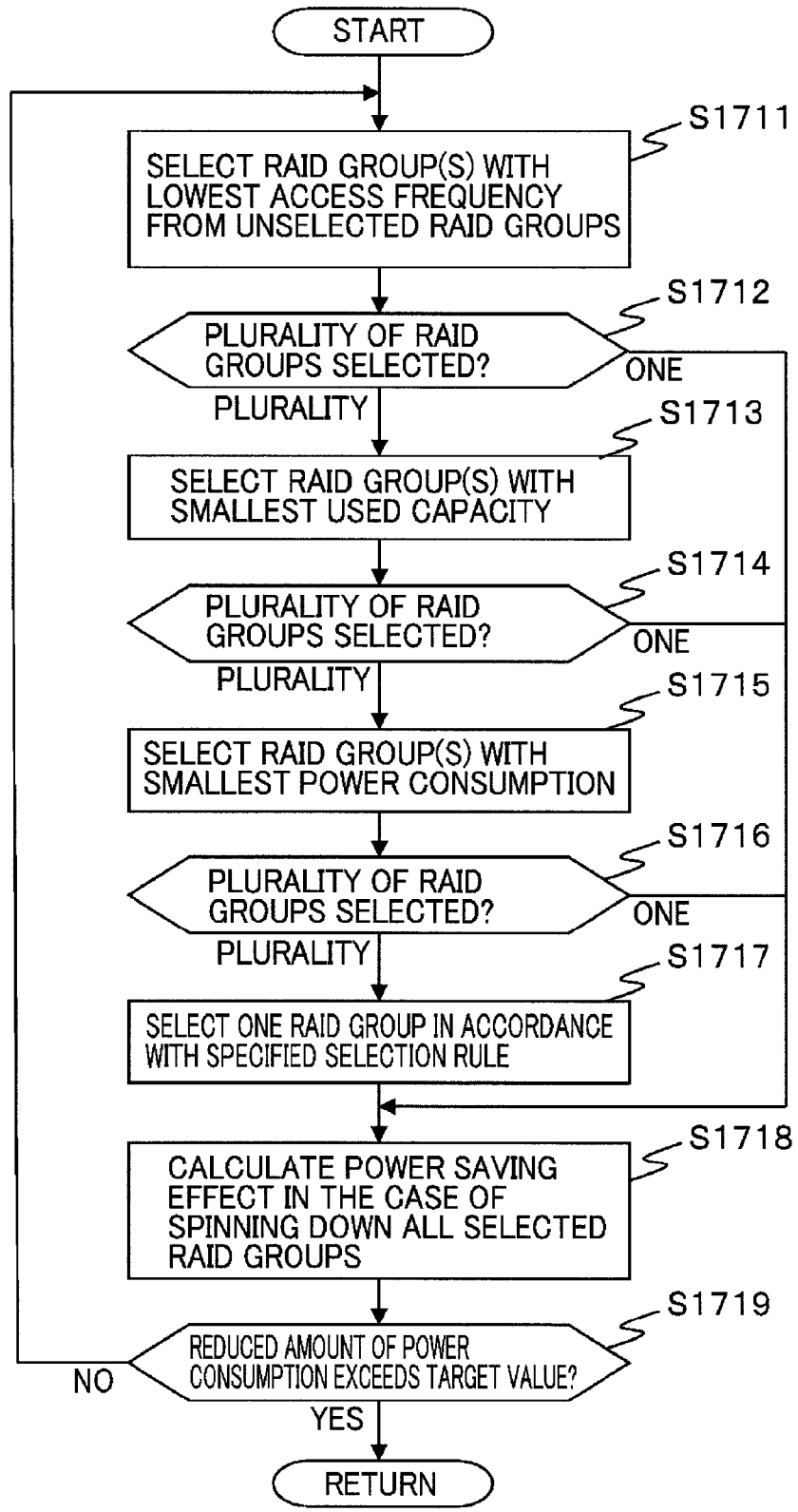
FIG. 17 is a flowchart describing the details of a host access prioritizing processing S1617 in FIG. 16A.

FIG. 17 is a flowchart describing the details of a host access prioritizing processing S1617 shown in FIG. 16A. For ensuring that the access performance of the host computer 30 for the storage apparatus 10 is prioritized, the management device 20, generates a power saving method and a reduced amount of power consumption by the method by performing the host access prioritizing processing S1617. Hereinafter, with reference to the figure, the host access prioritizing processing S1617 is described.

Firstly, the management device 20 refers to the RAID group management table 1200 and selects the RAID group 92 with the lowest access frequency of the RAID groups 92 configuring the storage pool 93 specified at S1611 (the RAID groups 92 with the smallest IOPS (I/O Per Second) (the number of I/O requests per second)) (S1711).

Next, the management device 20 determines whether a plurality of RAID groups 92 are selected at S1711 or not (when a plurality of RAID groups 92 with the smallest TOPS exist (that is, the TOPS of each RAID group 92 is equal)) (S1712). When only one RAID group 92 is selected (S1712: one), the process proceeds to S1718. If a plurality of RAID groups 92 are selected (S1712: plurality), the process proceeds to S1713.

At S1713, the management device 20 refers to the RAID group management table 1200 and selects the RAID group 92 with the smallest used capacity of the RAID groups 92 selected at S1711.

Next, the management device 20 determines whether a plurality of RAID groups 92 are selected at S1713 or not (if a plurality of RAID groups 92 with the smallest used capacity exist (that is, the used capacity of each RAID group 92 is equal)) (S1714). If only one RAID group 92 is selected (S1714: one), the process proceeds to S1718. If a plurality of RAID groups 92 are selected (S1714: plurality), the process proceeds to S1715.

At S1715, the management device 20 refers to the RAID group management table 1200 and, from the RAID groups 92 selected at S1711, selects one RAID group 92 in accordance with a specified selection rule (e.g. selecting the RAID groups 92 with the smallest RG-ID) with which the priority order can be determined.

At S1718, the management device 20 calculates the reduced amount of power consumption in the case all the selected RAID groups 92 are spun down (the difference between the power consumption of the storage apparatus 10 before the spin-down and the power consumption of the storage apparatus 10 after the spin-down).

At S1719, the management device 20 compares the reduced amount of power consumption calculated at S1718 with the target value set at S1615 and determines whether or not the reduced amount of power consumption calculated at S1718 exceeds the target value set at S1615. When the reduced amount does not exceed the target value (S1719: NO), the process returns to S1711 and repeats the processing from S1711 to S1718 until, at S1719, the reduced amount of power consumption calculated at S1718 exceeds the target value set at S1614. If the reduced amount of power consumption exceeds the target value (S1719: YES), the process proceeds to S1619 in FIG. 16A.

As described above, in the host access prioritizing processing S1617, the RAID group 92 with low access frequency is preferentially selected as the spin-down target. As described below, though, at the time of spin-down, the data stored in the RAID groups 92 as the spin-down target is migrated to other RAID groups 92 which are not the spin-down target, selecting the RAID group 92 with low access frequency preferentially as the spin-down target can efficiently prevent increase in access frequency (load concentration) of the RAID group 92 as the migration destination and decrease in access performance of the storage apparatus 10.

Figure 18:
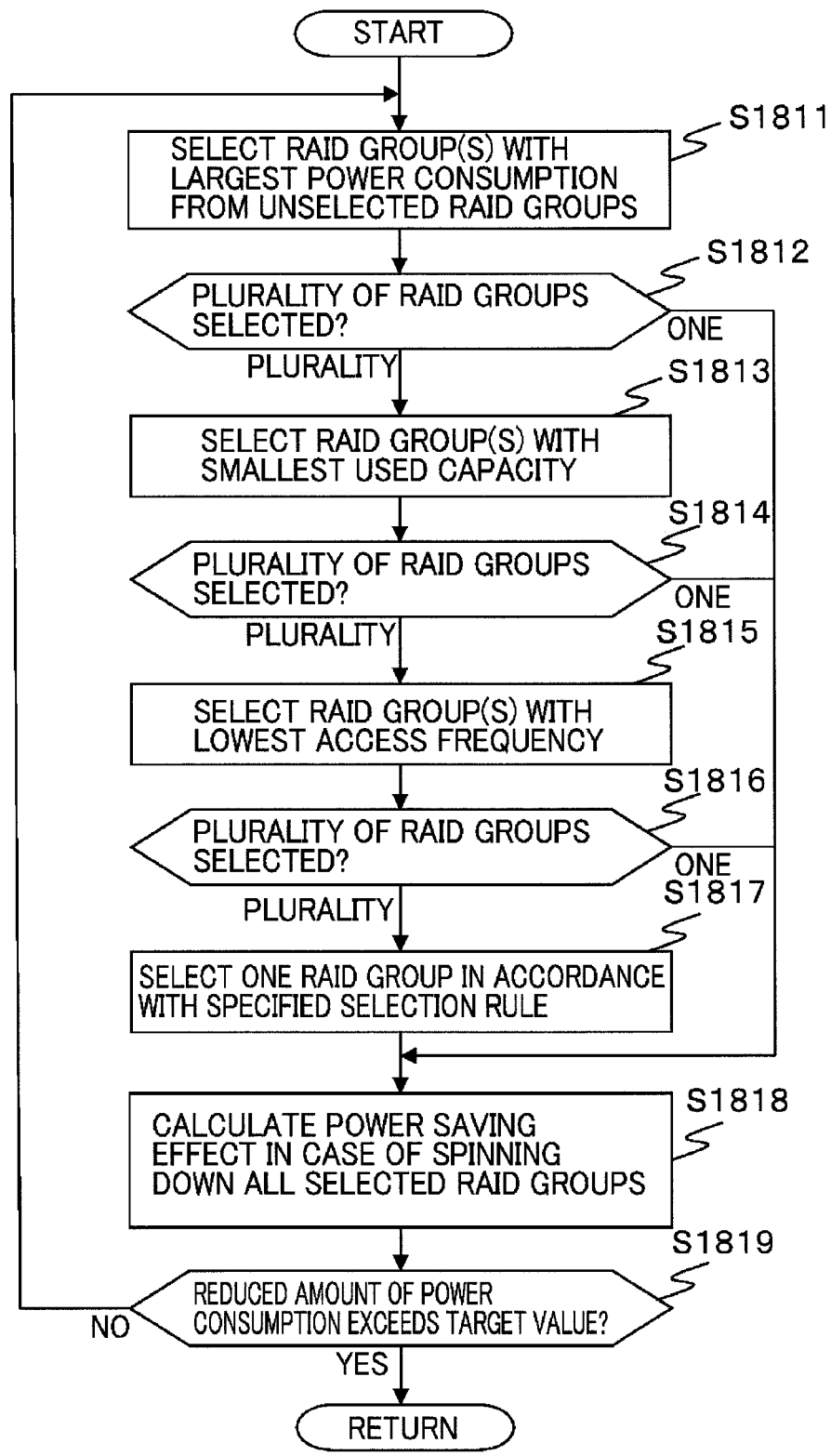
FIG. 18 is a flowchart describing the details of a power saving prioritizing processing S1618 in FIG. 16A.

FIG. 18 is a flowchart describing the details of a power saving prioritizing processing S1618 in FIG. 16A. The management device 20, by executing the power saving prioritizing processing S1618, generates a power saving method and a reduced amount of power consumption by the method for prioritizing power saving of the storage apparatus 10. Hereinafter, with reference to FIG. 18, the power saving prioritizing processing S1618 is described.

Firstly, the management device 20 refers to the RAID group management table 1200 and selects the RAID group 92 with the largest power consumption of the RAID groups 92 configuring the storage pool 93 specified at S1611 (S1811).

At S1812, the management device 20 determines whether a plurality of RAID groups 92 are selected at S1811 or not (a case where a plurality of RAID groups 92 with the largest power consumption exist (that is, the power consumption of each RAID group 92 is equal)). When only one RAID group 92 is selected (S1812: one), the process proceeds to S1818. When a plurality of RAID groups 92 are selected (S1812: plurality), the process proceeds to S1813.

At S1813, the management device 20 refers to the RAID group management table 1200 and selects the RAID group 92 with the smallest used capacity of the RAID groups 92 selected at S1811.

Next, the management device 20 determines whether a plurality of RAID groups 92 are selected at S1813 or not (a case where a plurality of RAID groups 92 with the smallest used capacity exist (that is, the used capacity of each RAID group 92 is equal)) (S1814). When only one RAID group 92 is selected (S1814: one), the process proceeds to S1818. When a plurality of RAID groups 92 are selected (S1814: plurality), the process proceeds to S1815.

At S1815, the management device 20 refers to the RAID group management table 1200 and in accordance with a specific selection rule (e.g. selecting the RAID groups 92 with the smallest RG-ID) with which the priority order can be determined, selects one RAID group 92 from the RAID groups 92 selected at S1811.

At S1818, the management device 20 calculates the reduced amount of power consumption in the case all the selected RAID groups 92 are spun down (the difference between the power consumption of the storage apparatus 10 before the spin-down and the power consumption of the storage apparatus 10 after the spin-down).

At S1819, the management device 20 compares the reduced amount of power consumption calculated at S1818 with the target value set at S1615 and determines whether or not the reduced amount of power consumption calculated at S1818 exceeds the target value set at S1615. When the reduced amount does not exceed the target value (S1819: NO), the process returns to S1811 and repeats the processing from S1811 to S1818 until, at S1819, the reduced amount of power consumption calculated at S1818 exceeds the target value set at S1615. When the reduced amount of power consumption exceeds the target value (S1819: YES), the process proceeds to S1619 in FIG. 16A.

As described above, in the power saving prioritizing processing S1618, the RAID group 92 with a large power consumption is preferentially selected as the spin-down target, and therefore, a reliable power saving effect can be expected.

Figure 19:
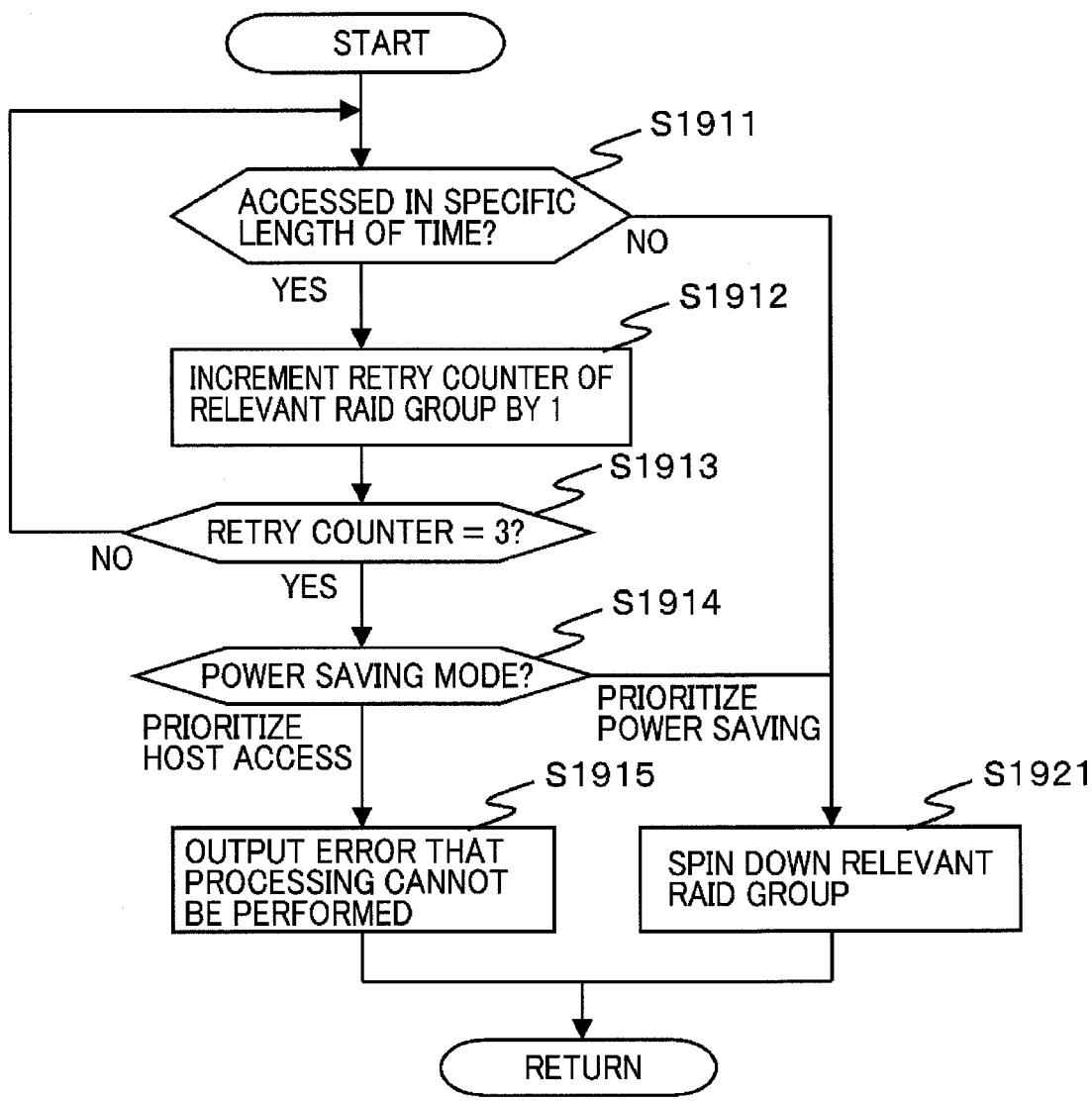
FIG. 19 is a flowchart describing the details of an entire pool power saving processing (1) S1614 in FIG. 16A.

FIG. 19 is a flowchart describing the details of the entire pool power saving processing (1) S1614 in FIG. 16A. The storage apparatus 10, by executing the relevant processing in response to an instruction from the management device 20, spins down the RAID group 92 configuring the storage pool 93 specified at S1611 (in the case only one RAID group 92 configuring the relevant storage pool 93). Hereinafter, with reference to FIG. 19, the entire pool power saving processing (1) S1614 is described.

The storage apparatus 10 monitors access from the host computer 30 to the (only one) RAID group 92 configuring the storage pool 93 specified at S1611 and determines whether the relevant RAID group 92 is accessed in a predetermined length of time (e.g. one minute) or not (S1911). If the RAID group 92 is accessed in the specified length of time (S1911: YES), the process proceeds to S1912 while, if the RAID group 92 is not accessed in the specified length of time (S1911: NO), the process proceeds to S1921.

At S1912, the storage apparatus 10 increments the value of the retry counter 1217 of the relevant RAID group 92 in the RAID group management table 1200 (by one).

At S1913, the storage apparatus 10 determines whether the value of the retry counter 1217 after the increment reaches the preset value (e.g. "3") or not. When the value of the retry counter 1217 reaches the threshold (S1913: YES), the process proceeds to S1914 while, when the value is smaller than the threshold (S1913: NO), the process returns to S1911.

At S1914, the storage apparatus 10 determines the contents of the power saving mode specified at S1612 of FIG. 16A. When "prioritize host access" is specified as the power saving mode (S1914: prioritize host access), the process proceeds to S1915 and, when "prioritize power saving" is specified (S1914: prioritize power saving), the process proceeds to S1921.

At S1921, the storage apparatus 10 spins down the RAID group 92 configuring the storage pool 93 specified at S1611.

As described above, the storage apparatus 10 immediately performs spin-down for the relevant RAID group 92 when only one RAID group 92 configures the storage pool 93 specified at S1611 and when the relevant RAID group 92 is not accessed by the host computer 30 (S1911: NO). Meanwhile, even when the relevant RAID group 92 is accessed by the host computer 30 (S1911: YES), the storage apparatus 10 spins down the relevant RAID group 92 after waiting for a specific length of time. Therefore, unless "prioritize host access" is specified as the power saving mode and, at the same time, the relevant RAID group 92 is not accessed by the host computer 30 (S1914: prioritize host access), power saving for the storage apparatus 10 can be ensured.

Figure 20:
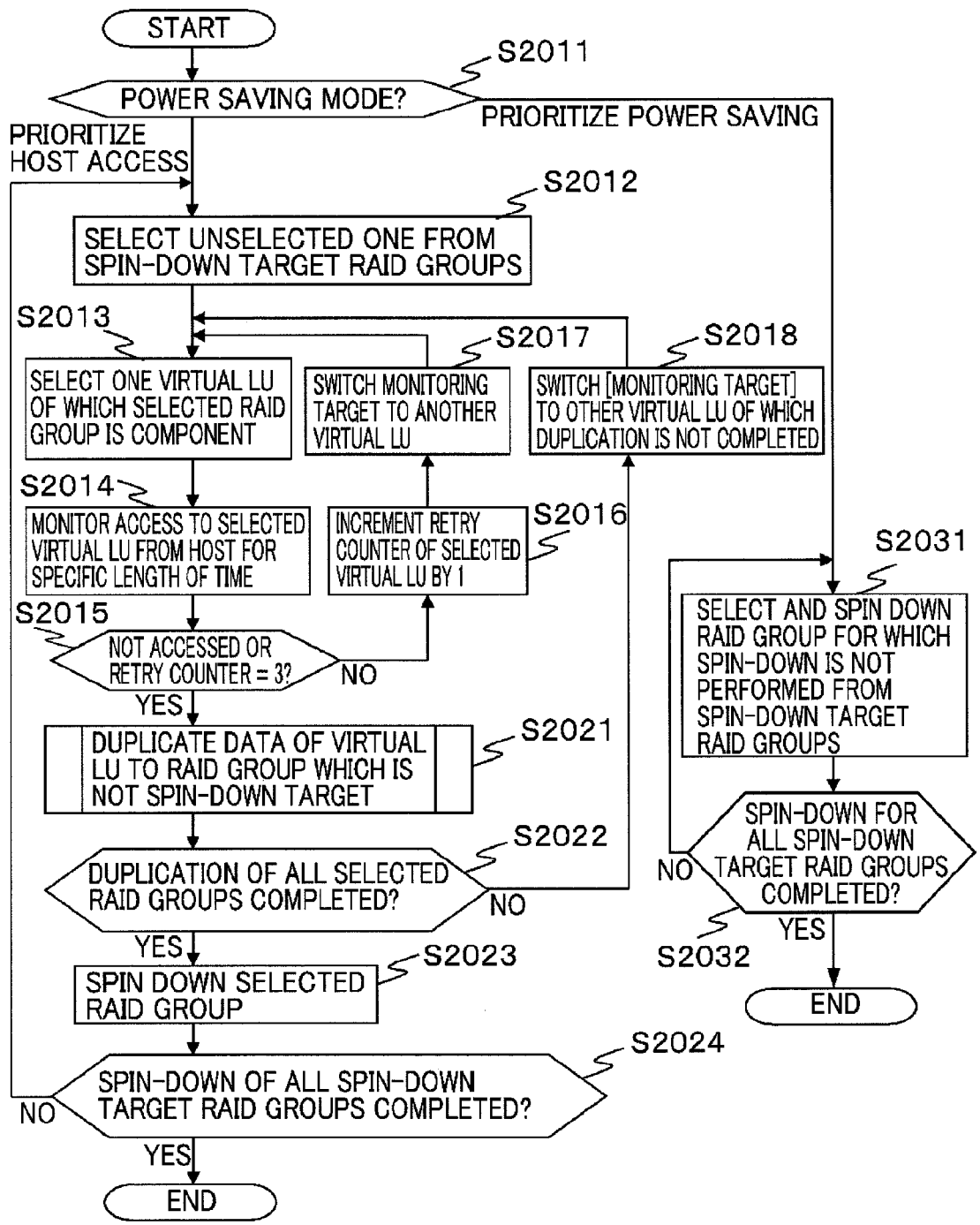
FIG. 20 is a flowchart describing the details of a power saving execution processing S1623 in FIG. 16B.

FIG. 20 is a flowchart describing the details of a power saving execution processing S1623 in FIG. 16B. The storage apparatus 10 actually spins down the RAID group 92 as the spin-down target by executing the relevant processing in response to an instruction from the management device 20, in accordance with the power saving method generated by the management device 20 at S1617 or the contents of the setting received at S1622. Hereinafter, with reference to FIG. 20, the power saving execution processing S1623 is described.

Firstly, the storage apparatus 10 determines the contents of the power saving mode specified at S1612 of FIG. 16A (S2011). When "prioritize host access" is specified as the power saving mode (S2011: prioritize host access), the process proceeds to S2012 and, when "prioritize power saving" is specified as the power saving mode (S2011: prioritize power saving), the process proceeds to S2031.

Firstly, the case in which "prioritize host access" is specified as the power saving mode is described. Firstly, the storage apparatus 10 selects one of the RAID groups 92 selected as the spin-down target (S2012). Next, the storage apparatus 10 refers to the virtual LU-RG correspondence management table 1300 and selects one virtual volume 912 (referred to as a "virtual LU" in the figure) whose data storage area is (which stores chunks in) the selected RAID group 92 (S2013).

Next, the storage apparatus 10 monitors access from the host computer 30 to the selected virtual volume 912 (S2014), and determines whether the relevant virtual volume 912 is accessed in a predetermined length of time (e.g. one minute) or not and whether the value of the retry counter for the relevant virtual volume 912 is 3 or not (S2015).

Note that the storage apparatus 10 manages the value of the retry counter and the value of the completion flag for each virtual volume 912 provided by the storage pool 93 specified at S1611. The table shown in FIG. 21 is an example of a table (hereinafter referred to as a virtual volume management table 2100) which the storage apparatus 10 stores for the above-mentioned management.

If the selected virtual volume 912 is not accessed from the host computer 30 in a specified length of time or if the value of the retry counter 2112 is 3 (S2015: YES), the process proceeds to S2021 while, if neither condition is satisfied (if the virtual volume 912 is accessed and, at the same time, if the value of the retry counter is 3) (S2015: NO), the process proceeds to S2016.

At S2016, the storage apparatus 10 increments the value of the retry counter 2112 of the currently selected virtual volume 912 (by one). At S2017, the storage apparatus 10 switches the monitoring target to another virtual volume 912 provided by the storage pool 93 specified at S1611. After that, the process returns to S2013.

At S2021, the storage apparatus 10 duplicates the data stored in the currently selected virtual volume 912 to other RAID groups 92 which are not the spin-down target. The details of this duplication processing are described later.

At S2022, the storage apparatus 10, for all the virtual volumes 912 whose data storage area is the currently selected RAID groups 92 (selected at S2012), determines whether the duplication of the data stored in the same (duplication to the RAID groups 92 which are not the spin-down target) is completed or not. When the duplication for all the virtual volumes 912 is completed (S2022: YES), the process proceeds to S2023 while, if the duplication is not completed, the process proceeds to S2018.

At S2018, the storage apparatus 10 switches the monitoring target to the other virtual volumes 912 for which the duplication is not completed (S2018). After that, the process returns to S2013.

At S2023, the storage apparatus 10 spins down the currently selected RAID groups 92 (selected at S2012). At S2024, the storage apparatus 10 determines whether the spin-down was performed for all the RAID groups 92 as the spin-down target or not. Among the RAID groups 92 as the spin-down target, when any RAID groups 92 for which spin-down is not performed yet remain (S2024: NO), the process returns to S2012. When the spin-down has been performed for all the RAID groups 92 (S2024: YES), the processing is completed.

At S2031, the storage apparatus 10 selects one or more RAID groups 92 for which spin-down is not performed yet from the RAID groups as the spin-down target, and performs spin-down.

At S2032, the storage apparatus 10 determines whether the spin-down was performed for all the RAID groups 92 as the spin-down target or not. Among the RAID groups 92 as the spin-down target, when any RAID groups 92 for which spin-down is not performed yet remain (S2032: NO), the process returns to S2031. When the spin-down has been performed for all the RAID groups 92 (S2032: YES), the processing is completed.

Next, the data duplication method from RAID groups 92 as the spin-down target to RAID groups 92 which are not the spin-down target (hereinafter also referred to as the migration destination) at S2021 in FIG. 20 is described.

FIG. 22 is a table (hereinafter referred to as a duplication ratio management table 2200) which the storage apparatus 10 refers to in data duplication. The storage apparatus 10 retains a duplication ratio management table 2200 for each storage pool 93. As shown in FIG. 22, the duplication ratio management table 2200 includes respective items of an RG-ID 2211, a virtual LUN 2212, a storage capacity 2213, an access frequency 2214, and a duplication ratio 2215.

For the RG-ID 2211, an RG-ID is set. For the virtual LUN 2212, the virtual LUN of a virtual volume 912 of which the RAID groups 92 is a component (whose chunks exist in the RAID group 92) is set. For the storage capacity 2213, the data amount of the respective virtual volumes 912 in the RAID group 92 (the total capacity of the chunks of the respective virtual volumes 912 stored in the relevant RAID group 92) is set. For the access frequency 2214, the access frequency (IOPS) of the virtual volume 912 is set. For the duplication ratio 2215, the data duplication ratio in the case the virtual volume 912 is the duplication destination is set.

The storage apparatus 10 duplicates the data of the virtual volume 912 stored in the RAID group 92 as the duplication source to the RAID group 92 as the duplication destination in accordance with the duplication ratio. This duplication method is concretely described with reference to FIG. 22 as an example. Note that, FIG. 22 assumes that the RAID groups 92 whose RG-ID 2211 is "0" are the RAID groups 92 as the duplication source and that the RAID groups 92 whose RG-IDs 2211 are "1" and "2" are the RAID groups 92 as the duplication destination. Furthermore, it is assumed that data duplication is performed in units of chunks.

In FIG. 22, firstly, as for the virtual volume 912 whose virtual LUN 2212 is "0," the contents of the duplication ratios 2215 for the RAID groups 92 whose RG-IDs 2211 are "1" and "2" are "2" and "1" respectively. Therefore, for duplication of the virtual volume 912 whose virtual LUN is "0", firstly, two chunks of the virtual volume 912 whose RG-ID 2211 is "0" and whose virtual LUN is "0" are duplicated to the virtual volume 912 whose RG-ID 2211 is "1" and whose virtual LUN is "0," and then a chunk of the virtual volume 912 whose RG-ID 2211 is "0" and whose virtual LUN is "0" is duplicated to the virtual volume 912 whose RG-ID 2211 is "2" and whose virtual LUN is "0." This processing is repeated until there are no more chunks of the virtual volumes 912 stored in the RAID group 92 whose RG-ID 2211 is "1." The duplication processing of the data in the RAID group 92 as the duplication source to the RAID group 92 as the duplication destination complying with the duplication ratio is performed as above.

Next, the methods for setting the duplication ratio 2215 are described below. The setting methods are, for example, the setting method in accordance with the ratio of the data amount currently stored in each RAID group 92 as the duplication destination (for ensuring that more data is duplicated to the RAID groups 92 whose current data amount is small) (hereinafter referred to as the setting method 1), the setting method in accordance with the access frequency of each RAID group 92 as the duplication destination (for ensuring that more data is duplicated to the RAID groups 92 whose current access frequencies are low) (hereinafter referred to as the setting method 2), the setting method of allocating the data stored in the RAID groups 92 as the duplication source to each virtual volume 912 of the RAID groups 92 as the duplication destination by the round-robin method (hereinafter referred to as the setting method 3), and others.

Note that, according to the above-mentioned setting method 1, duplication is performed for equalizing the data amount stored in each not-yet selected RAID group 92. Meanwhile, according to the setting method 2, duplication is performed for equalizing the access frequency for each not-yet selected storage resource. Therefore, according to the setting method 1 or 2, access concentration to a specific RAID group 92 after duplication can be prevented.

In FIG. 22, as for the virtual volumes 912 whose virtual LUN 2212 is "0" for the respective RAID groups 92 whose RG-ID 2211 are "1" and "2," the ratio of the access frequencies 2214 is 500:250, and therefore, according to the setting method 2, the duplication ratio is set as the inverse ratio of access frequency=2:1. Meanwhile, as for the virtual volumes 912 whose virtual LUN 2212 is "1" for the respective RAID groups 92 whose RG-ID 2211 are "1" and "2," the ratio of the storage capacities 2213 is 20:15, and therefore, according to the setting method 1, the duplication ratio is set as the inverse ratio of storage capacities=3:4. Meanwhile, as for the virtual volumes 912 whose virtual LUN 2212 is "2" for the respective RAID groups 92 whose RG-ID 2211 are "1" and "2," the ratio of the storage capacities 2213 is 13:15, which is nearly equal, and the ratio of the access frequencies 2214 is 700:600, which is also nearly equal, and therefore, either by setting method 1 or setting method 2, the duplication ratio is set as 1:1.

Figure 23:
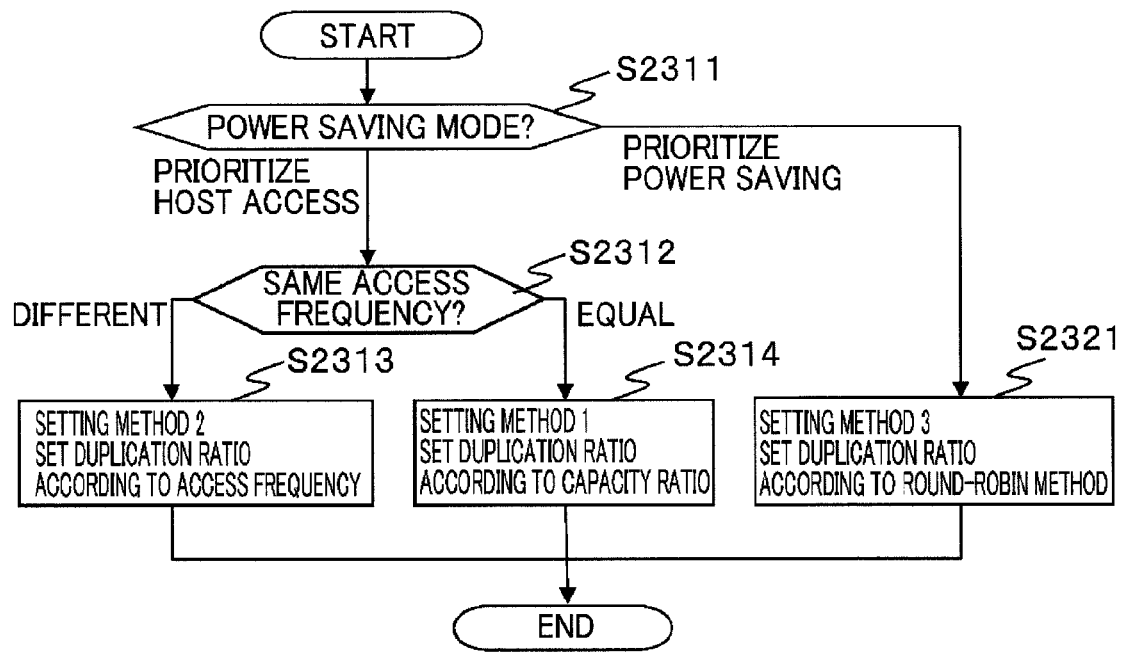
FIG. 23 is a flowchart describing an example of the method of setting the duplication ratio in accordance with the power saving mode.

In data duplication at S2021 in FIG. 20, in accordance with the power saving mode specified at S1612 in FIG. 16A, the setting method of the duplication ratio may also be switched. FIG. 23 is a flowchart describing an example of the method of setting the duplication ratio in accordance with the specified power saving mode.

Firstly, the storage apparatus 10 determines the contents of the power saving mode specified at S1612 of FIG. 16A (S2311). When "prioritize host access" is specified as the power saving mode (S2311: prioritize host access), the process proceeds to S2312 and, when "prioritize power saving" is specified as the power saving mode (S2311: prioritize power saving), the process proceeds to S2321.

At S2312, the storage apparatus 10 determines whether the access frequencies of the two virtual volumes 912 as the comparison target (the access frequencies 2214 in the duplication ratio management table 2200) are equal or not for setting the duplication ratio. When the access frequencies are not equal (S2312: different), the storage apparatus 10 sets the duplication ratio by the setting method 2 (access frequency) (S2313). When the access frequencies are equal (S2312: equal), the storage apparatus 10 sets the duplication ratio by the setting method 1 (capacity ratio) (S2314). At S2321, the storage apparatus 10 sets the duplication ratio by the setting method 3 (the round-robin method).

As described above, by switching the setting method in accordance with the contents of the power saving mode, when "prioritize host access" is specified, the access performance from the host computer 30 can be secured more reliably.

Figure 24A:
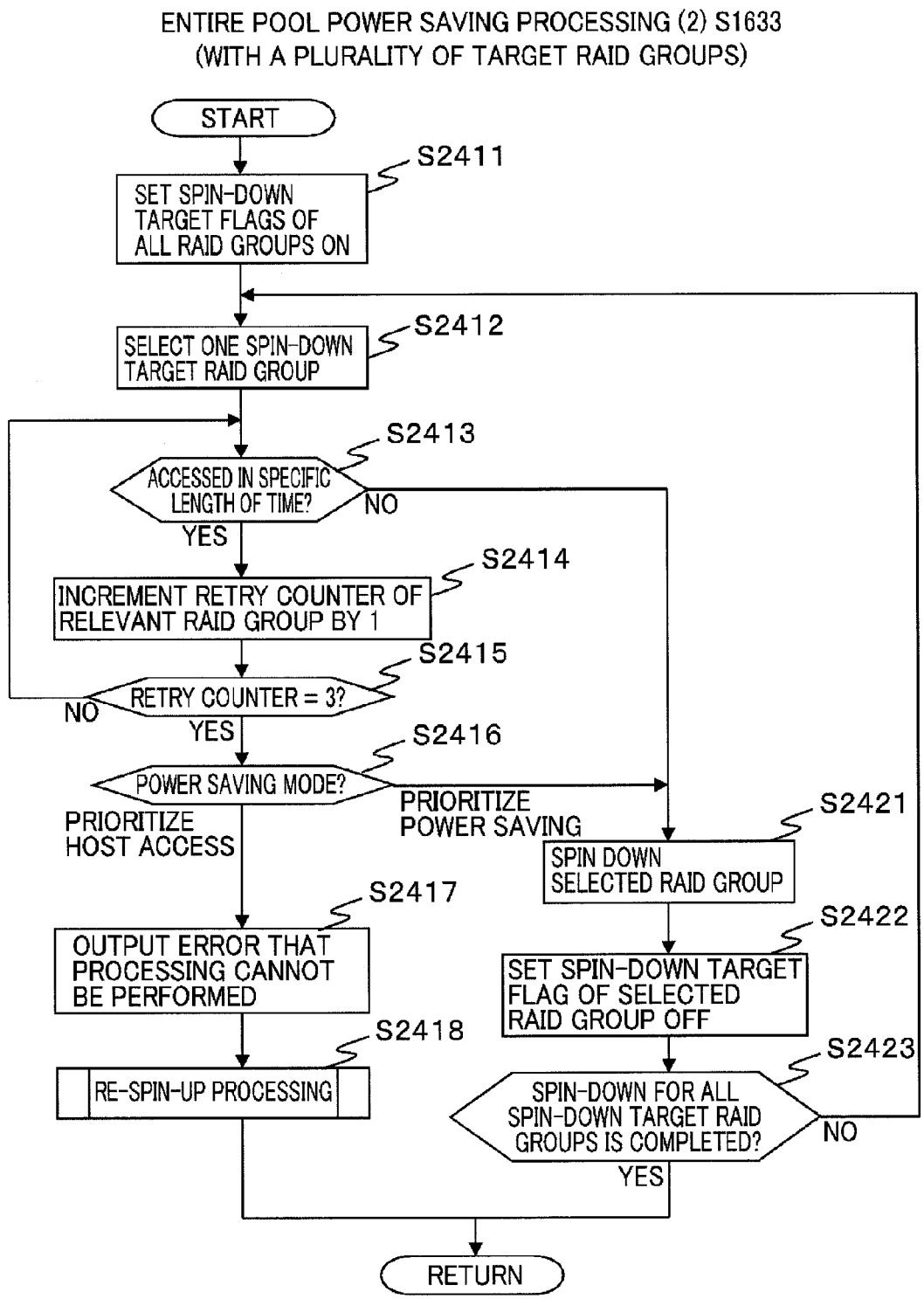
FIG. 24A is a flowchart describing the details of an entire pool power saving processing (2) S1633 in FIG. 16B.

FIG. 24A is a flowchart describing the details of the entire pool power saving processing (2) S1633 in FIG. 16B. The storage apparatus 10 spins down all the RAID groups 92 configuring the storage pool 93 specified at S1611, by executing the relevant processing in response to an instruction from the management device 20. Hereinafter, with reference to FIG. 24A, the entire pool power saving processing (2) S1633 is described.

Firstly, the storage apparatus 10 sets on the spin-down target flag 1216 of the RAID group management table 1200 shown in FIG. 12 for all the RAID groups 92 configuring the storage pool 93 specified at S1611 (S2411).

Next, the storage apparatus 10 selects one RAID group 92 whose spin-down target flag 1216 is set on from all the RAID groups 92 configuring the storage pool 93 specified at S1611 (S2412).

Next, the storage apparatus 10 monitors access from the host computer 30 to the selected RAID group 92 and determines whether or not the relevant RAID group 92 is accessed in a predetermined length of time (e.g. in one minute) (S2413). When the RAID group 92 is accessed in the specified length of time (S2413: YES), the process proceeds to S2414 while, if the RAID group 92 is not accessed in the specified length of time (S2413: NO), the process proceeds to S2421.

At S2414, the storage apparatus 10 increments the value of the retry counter 1217 of the relevant RAID group 92 in the RAID group management table 1200 (by one).

At S2415, the storage apparatus 10 determines whether or not the value of the retry counter 1217 after the increment reaches the preset value (e.g. "3"). If the value of the retry counter 1217 reaches the threshold (S2415: YES), the process proceeds to S2416 while, if the value is smaller than the threshold (S2415: NO), the process returns to S2413.

At S2416, the storage apparatus 10 determines the contents of the power saving mode specified at S1612 of FIG. 16A. When "prioritize host access" is specified as the power saving mode (S2416: prioritize host access), the process proceeds to S2417 and, when "prioritize power saving" is specified as the power saving mode (S2416: prioritize power saving), the process proceeds to S2421.

At S2417, the storage apparatus 10 notifies that power saving cannot be performed to the management device 20. At S2418, the storage apparatus 10 performs spin-up for the RAID groups 92 for which spin-down is already performed at S2421 which is described later, and restores the storage pool 93 specified at S1611 to an available status.

Figure 24B:
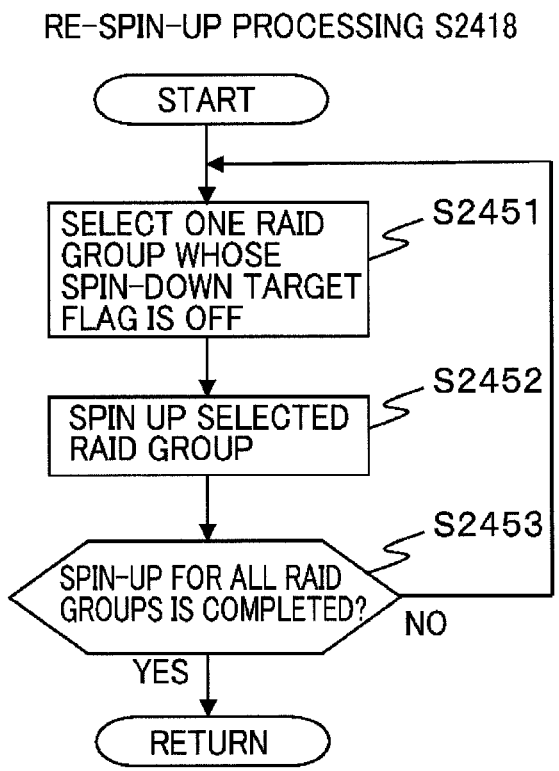
FIG. 24B is a flowchart describing a re-spin-up processing S2418 in FIG. 24A.

FIG. 24B is a flowchart describing the details of the processing at S2418 in FIG. 24A (hereinafter referred to as the re-spin-up processing S2418). Firstly, the storage apparatus 10, among the RAID groups 92 configuring the storage pool 93 specified at S1611, selects one RAID group 92 whose spin-down target flag 1216 is set off (S2451). Next, the storage apparatus 10 performs spin-up for the selected RAID group 92. Next, the storage apparatus 10 determines whether or not spin-up is completed for all the RAID groups 92 configuring the storage pool 93 specified at S1611 (S2453). If spin-up is not completed for all the RAID groups 92 (S2453: NO), the process returns to S2451. If spin-up is completed (S2453: YES), the processing is completed.

Returning to FIG. 24A, at S2421 in FIG. 24A, the storage apparatus 10 performs spin-down for the selected RAID group 92. Furthermore, the storage apparatus 10 sets off the spin-down target flag 1216 of the relevant RAID group 92 (S2422). At S2423, the storage apparatus 10, for all the RAID groups 92 configuring the storage pool 93 specified at S1611 in FIG. 16A, determines whether spin-down is already performed or not. If spin-down is not performed for all the RAID groups 92 (S2423: NO), the process returns to S2412. If spin-down is completed (S2423: YES), the processing is completed.

As described above, the storage apparatus 10 checks whether or not each of the RAID groups 92 configuring the storage pool 93 specified at S1611 is accessed from the host computer 30 when all the RAID groups 92 configuring the storage pool 93 specified at S1611 are the spin-down target and, if a RAID group 92 is not accessed (S2413: NO), immediately performs spin-down for the RAID group 92. Meanwhile, even if the RAID group 92 is accessed by the host computer 30 (S2413: YES), the storage apparatus 10 spins down the relevant RAID group 92 forcibly after waiting for a specific length of time. Therefore, unless "prioritize host access" is specified as the power saving mode and, at the same time, the RAID group 92 is not accessed by the host computer 30 (S2416: prioritize host access), power saving for the storage apparatus 10 can be ensured.

Figure 25A:
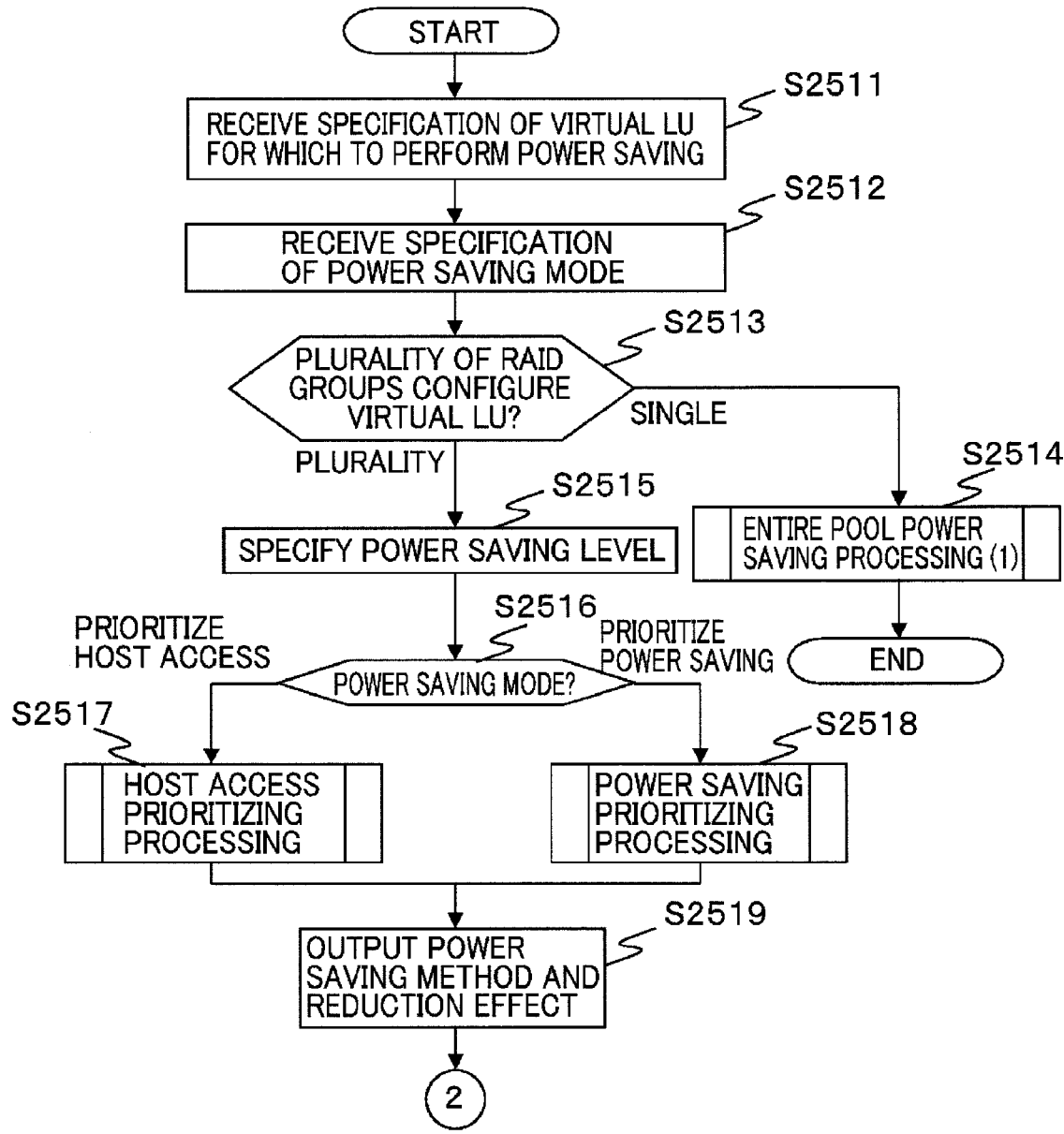
FIG. 25A is a flowchart describing a power saving processing (virtual volume specification) S2500.
Figures 25B, 26:
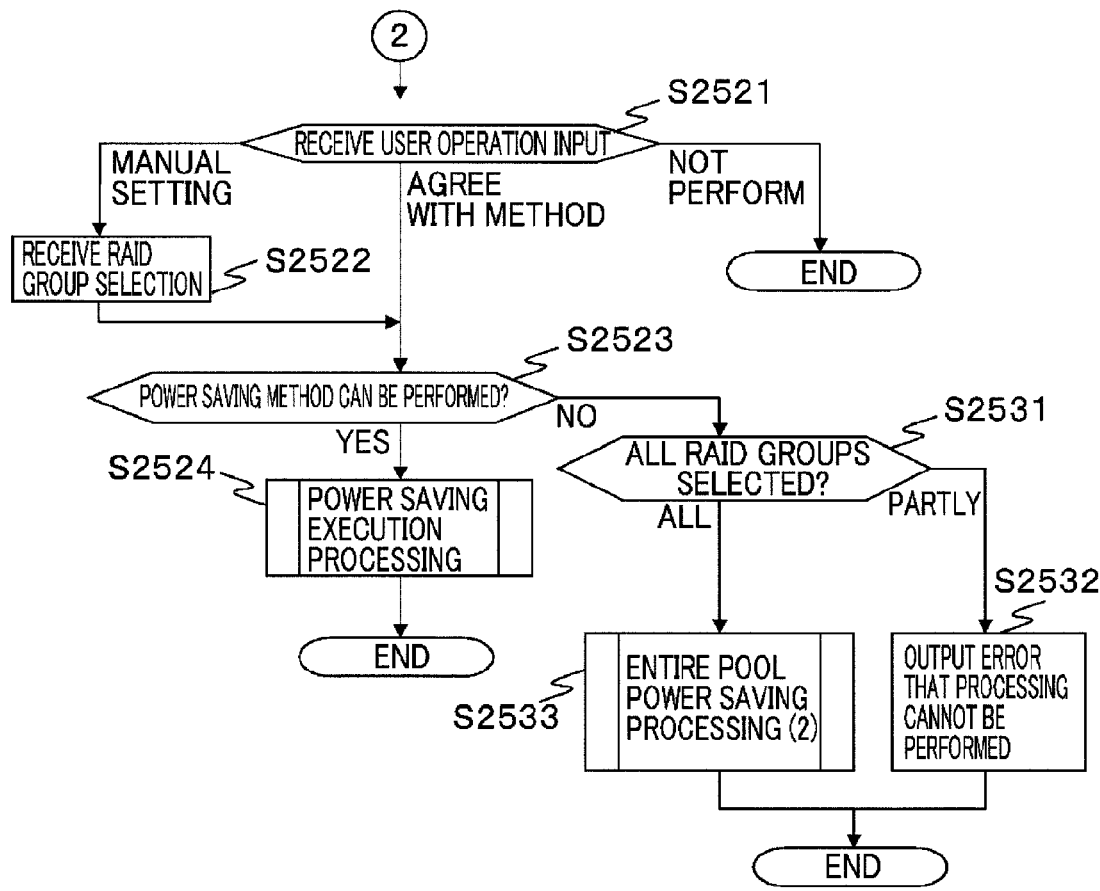
FIG. 25B is a flowchart describing the power saving processing (virtual volume specification) S2500.
FIG. 26 is an example of a pool capacity management table 2600.

On the other hand, though the description above determines the RAID groups 92 as the spin-down target by making the user specify the storage pool 93 for which they desire to perform power saving (S1611 in FIG. 16A), it is also possible to determine the RAID groups 92 as the spin-down target by making the user specify the virtual volume 912 for which they desire to perform power saving. FIG. 25A and FIG. 25B are the flowcharts describing the processing performed by the storage system 1 (hereinafter referred to as the power saving processing (virtual volume specification) S2500) related to setting and performing the power saving function in the case of determining the RAID groups 92 to spin down by making the user specify the virtual volume 912 for which they desire to perform power saving. Hereinafter, with reference to FIG.

25A and FIG. 25B, the power saving processing (virtual volume specification) S2500 is described.

Firstly, the management device 20 receives a specification of a virtual volume 912 from the user (S2511). Next, the management device 20 receives a specification of a power saving mode from the user (S2512). The user, as the power saving mode, can specify either "prioritize host access" or "prioritize power saving."

Next, the management device 20 refers to the virtual LU-RG correspondence management table 1300 and determines whether the number of RAID group(s) 92 configuring the specified virtual volume 912 (the RAID group(s) 92 storing the chunks of the relevant virtual volume 912) is plural or not (S2513). If the number of RAID group(s) configuring the specified virtual volume 912 is single (S2513: single), the process proceeds to S2514 and, if the number is plural (S2513: plurality), proceeds to S2515.

At 2514, the storage apparatus 10 performs the power saving processing for the entire storage pool 93 in response to an instruction from the management device 20 (spinning down all the RAID groups 92 configuring the virtual volume 912 specified at S2511 (hereinafter referred to as the entire pool power saving processing (1) S2514). Note that the details of the entire pool power saving processing (1) S2514 is basically the same as the processing shown in FIG. 19.

At S2515, the management device 20 receives a specification of a power saving level (power saving effect) from the user and, in accordance with the received power saving level, sets the determination threshold used in the processing described later. As in the case of specifying the storage pool 93, the user can select and input any of "emphasize power saving," "emphasize balance," or "emphasize performance" as the power saving level.

Next, the management device 20 determines the contents of the power saving mode specified at S2512 (S2516). If "prioritize host access" is specified as the power saving mode (S2516: prioritize host access), the process proceeds to S2517 and, if "prioritize power saving" is specified (S2516: prioritize power saving), the process proceeds to S2518.

At 2517, the management device 20 performs the power saving method in the case of prioritizing securing access performance from the host computer 30 and the processing of generating the reduced amount of power consumption (hereinafter referred to as the host access prioritizing processing S2517). At S2518, the management device 20 performs the power saving method in the case of prioritizing power saving and the processing of generating the reduced amount of power consumption (hereinafter referred to as the power saving prioritizing processing S2518). Note that the details of the host access prioritizing processing S2517 is basically the same as the host access prioritizing processing S1617 shown in FIG. 17, and the details of the power saving prioritizing processing S2518 is basically the same as the power saving prioritizing processing S1618 shown in FIG. 18.

At S2519, the management device 20 outputs the result of the host access prioritizing processing S2517 or the power saving prioritizing processing S2518 (a power saving method and the reduced amount of power consumption by the same). After that, the process proceeds to S2521 in FIG. 25B.

At S2521 in FIG. 25B, the management device 20 receives an instruction from the user with regard to whether to perform the power saving method output at S2519 or not and whether to perform the manual setting. When the user instructs the "manual setting" (S2521: manual setting"), the process proceeds to S2522. When the user instructs to "agree with the method" (S2521: agree with method"), the process proceeds to S2523. When the user instructs "not to perform the method" (S2521: not perform"), the processing is completed.

At S2522, the management device 20 outputs a list of RAID groups 92 configuring the storage pool 93 specified at S2511 and receives the specification of the RAID groups 92 to be spun down from the user. Then, the process proceeds to S2523.

At S2523, the management device 20 refers to the RAID group management table 1200 and determines whether the power saving method output at S2519 or the power saving method of spinning down the RAID group 92 manually specified at S2522 can be performed or not. When determining that the method can be performed (S2523: YES), the process proceeds to S2524 while, if determining that the method cannot be performed (S2523: NO), proceeds to S2531.

The above-mentioned determination whether the method can be performed or not is performed by checking whether or not the data stored in the RAID groups 92 as the spin-down target can be duplicated to other RAID groups 92 which are not the spin-down target. Furthermore, in this case, whether the above-mentioned duplication can be performed or not is determined with reference to the conditions, for example, whether there are enough free areas in the duplication destination RAID groups 92 or not and whether the performance (e.g. the access performance) of the duplication destination RAID groups 92 is equal to (or within the allowable range of) or higher than the duplication source RAID groups 92 or not.

At S2524, the storage apparatus 10, in response to the instruction from the management device 20, performs the power saving processing for the storage apparatus 10 in accordance with the power saving method output at S2519 or the power saving method by spinning down the RAID group 92 manually specified at S2522 (hereinafter referred to as the power saving execution processing S2524). Note that the details of the power saving execution processing S2524 are basically the same as the power saving execution processing S1624 shown in FIG. 20.

At S2531, the management device 20 determines whether or not all the RAID groups 92 configuring the virtual volumes 912 specified at S2511 are selected as the spin-down target. When only a part of the RAID groups 92 are selected (S2531: partly), the management device 20 outputs a message that the power saving method cannot be performed (S2532). Meanwhile, when all the RAID groups 92 are selected (S2531: all), the process proceeds to S2533.

At S2533, the storage apparatus 10, in accordance with the instruction from the management device 20, performs the power saving processing for the entire storage pool 93 (spinning down all the RAID groups 92 configuring the virtual volume 912 specified at S2511) (hereinafter referred to as the virtual volume entire pool power saving processing (2) S2533). The details of the virtual volume entire pool power saving processing (2) S2533 is basically the same as the entire pool power saving processing (2) S1633 shown in FIG. 24A and FIG. 24B.

As described above, the user can also set power saving by specifying the virtual volume 912 for which they desire to perform power saving. As above, according to the storage system 1 of the present embodiment, it is possible to respond to the user's needs flexibly.

Pool Capacity Management Function

The storage apparatus 10 includes a function of notifying that the automatic spin-up of RAID groups 92 in process of spin-down or the spin-up of RAID groups 92 in process of spin-down is required in accordance with the usage rate of a storage pool 93.

FIG. 26 is a table which the storage apparatus 10 manages related to the above-mentioned function (hereinafter referred to as a pool capacity management table 2600). The contents of the pool capacity management table 2600 can be referred to by the management device 20 as needed.

As shown in FIG. 26, the pool capacity management table 2600 is configured with one or more records each including the items of a pool ID 2611, a total capacity 2612, a used capacity 2613, a usage rate 2614, a first threshold 2615, a second threshold 2616, a total capacity (considering power saving) 2617, a usage rate (considering power saving) 2618, and an automatic spin-up flag 2619.

A pool ID is set to the pool ID 2611. The total capacity of the storage pool 93 is set to the total capacity 2612. The currently used capacity of the storage pool 93 is set to the used capacity 2613. The usage rate of the storage pool 93 is set to the usage rate 2614 (=the value of the used capacity 2613/the value of the total capacity 2612).

The usage rate which is the criterion for notifying an alert is set to the first threshold 2615. That is, the storage apparatus 10 notifies that the spin-up of a RAID group 92 is required to the management device 20 when the value of the usage rate 2614 exceeds the first threshold 2615. Note that this notification is performed by using, for example, the SNMP (Simple Network Management Protocol) or an email protocol.

The usage rate which is the criterion for automatically spinning up RAID groups 92 to the second threshold 2616. That is, the storage apparatus 10 automatically spins up the RAID groups 92 in process of spin-down belonging to the storage pool 93 when the value of the usage rate 2614 exceeds the value of the second threshold 2616.

For the total capacity (considering power saving) 2617, there is set the total capacity of the storage pool 93 in the case of considering the RAID groups 92 in process of spin-down. That is, for the total capacity (considering power saving) 2617, there is set the value of the total capacity 2612 minus the capacity of the RAID groups 92 currently in process of spin-down.

For the usage rate (considering power saving) 2618, there is set the usage rate of the storage pool 93 in the case of considering the RAID groups 92 in process of spin-down. That is, there is set for the usage rate (considering power saving) 2618, "the value of the used capacity 2613/the value of the total capacity (considering power saving) 2617."

For the automatic spin-up flag 2619, there is set a flag indicating whether or not to permit the automatic spin-up of the RAID groups 92 in process of spin-down (on (1): permit, off (2): deny).

Note that, as for the pool capacity management table 2600 in FIG. 26, the storage pool 93 whose pool ID 2611 is "0" is the storage pool 93 for which the power saving is not applied. Therefore, for the relevant storage pool 93, no values are set for the total capacity (considering power saving) 2617 and the usage rate (considering power saving) 2618.

Figure 27:
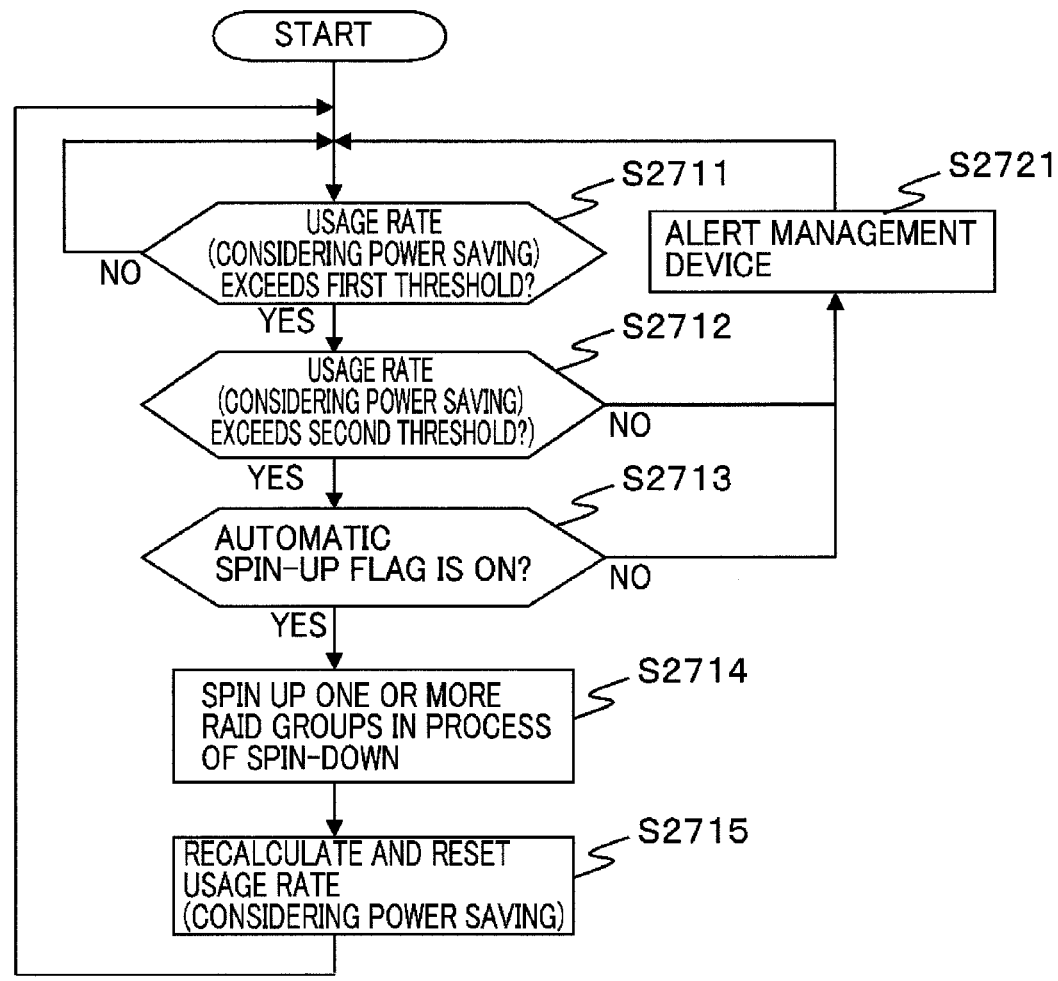
FIG. 27 is a flowchart describing a pool capacity monitoring processing S2700.

FIG. 27 is a flowchart describing the processing related to the above-mentioned function performed by the storage apparatus 10 (hereinafter referred to as a pool capacity monitoring processing S2700).

The storage apparatus 10, for each storage pool 93 registered to the pool capacity management table 2600, determines in real time whether or not the value of the usage rate (considering power saving) 2618 exceeds the first threshold (S2711). When determining that the usage rate (considering power saving) 2618 of the storage pool 93 exceeds the first threshold (S2711: YES), the process proceeds to S2712.

At S2712, the storage apparatus 10 determines whether or not the value of the usage rate (considering power saving) 2618 exceeds the second threshold, for the storage pool 93 whose value of the usage rate 2618 was determined to exceed the first threshold at S2711, When the value of the usage rate (considering power saving) 2618 of the relevant storage pool 93 exceeds the second threshold (S2712: YES), the process proceeds to S2713. When the value of the usage rate (considering power saving) 2618 does not exceed the second threshold (S2712: NO), the process proceeds to S2721.

At 2713, the storage apparatus 10 determines whether the value of the automatic spin-up flag 2619 for the storage pool 93 whose value of the usage rate (considering power saving) 2618 is determined to exceed the second threshold at S2712 is on or not. When the value of the automatic spin-up flag 2619 is on (S2713: YES), the process proceeds to S2714 while, when the value of the automatic spin-up flag 2619 is off (S2713: NO), the process proceeds to S2721.

At S2714, the storage apparatus 10 spins up one or more of the RAID groups 92 of the storage pool 93 in process of spin-down whose value of the usage rate (considering power saving) 2618 is determined to exceed the second threshold.

At S2715, the storage apparatus 10 recalculates the value of the usage rate (considering power saving) 2618 for the storage pool 93 one or more RAID groups 92 of which are spun up at S2714, and sets the recalculated value for the usage rate (considering power saving) 2618 of the relevant storage pool 93 in the pool capacity management table 2600. Thereafter, the process returns to S2711.

At S2721, the storage apparatus 10 alerts (that the capacity of the relevant storage pool 93 is insufficient, that the capacity expansion of the storage pool 93 is lacking, and the like) the management device 20.

As described above, when the remaining capacity of the storage pool 93 decreases due to the increase of the usage rate of the storage pool 93, the storage apparatus 10 notifies of such, and performs the automatic spin-up and the like of the RAID groups 92 in process of spin-down, by which the expansion of the capacity is attempted. Furthermore, if the capacity is still lacking even after the recalculation, a further notification is made or the spin-up of the other RAID groups 92 is performed. As above, according to the structure above, even if power saving function is applied, a secure operation of storage pools 93 can be attempted.

Access Frequency Acquisition Function

As a structure for efficiently operating the storage system 1, a so called hierarchical storage (Tiered Storage) for the management system of the storage system 1 is well known. In the hierarchical storage, the information is stored in accordance with the utilization value of information (data), for example, in any of a plurality of storage apparatus groups as the storage destination such as a highly-reliable storage apparatus group using Fibre Channel or the like (hereinafter referred to as a "Tier 1"), a storage apparatus group with a large-capacity and low-cost configuration where data whose main purpose is to reuse after the actual operation (mainly search and reference) is stored (hereinafter referred to as a "Tier 2"), and a storage apparatus group with the low access frequency which is usually offline (hereinafter referred to as a "Tier 3"), for example, tape drives, storage apparatuses specifically for archive, and the like.

In the hierarchical storage, the storage apparatuses are classified into an upper layer storage apparatus group (e.g. the "Tier 1") which are cascaded seen from the host computer 30 and communicate directly with the host computer 30 and a lower layer storage groups (e.g. the "Tier 2," "Tier 3") which communicate directly with the host computer 30 via the above-mentioned storage apparatus groups. Furthermore, in the hierarchical storage, data stored in the upper layer storage apparatus group (e.g. "Tier 1") is migrated to the lower layer storage apparatus groups as needed in accordance with the access performance, the importance and the like of the same.

At this point, for the above-mentioned migration, the information for determining the necessity of the migration is managed by at least any of the storage apparatus groups, and there are some cases where any storage apparatus group retains the information equivalent to the information stored in the RAID group management table 1200 shown in FIG. 12, as the above-mentioned type of information (e.g. the power consumption amount 1212, the total capacity 1213, the used capacity 1214, and the access frequency 1215). In such cases, the storage apparatus 10 can acquire the information equivalent to the information stored in the RAID group management table 1200 without collecting information for power saving separately by utilizing these pieces of information, when performing power saving.

Figure 28:
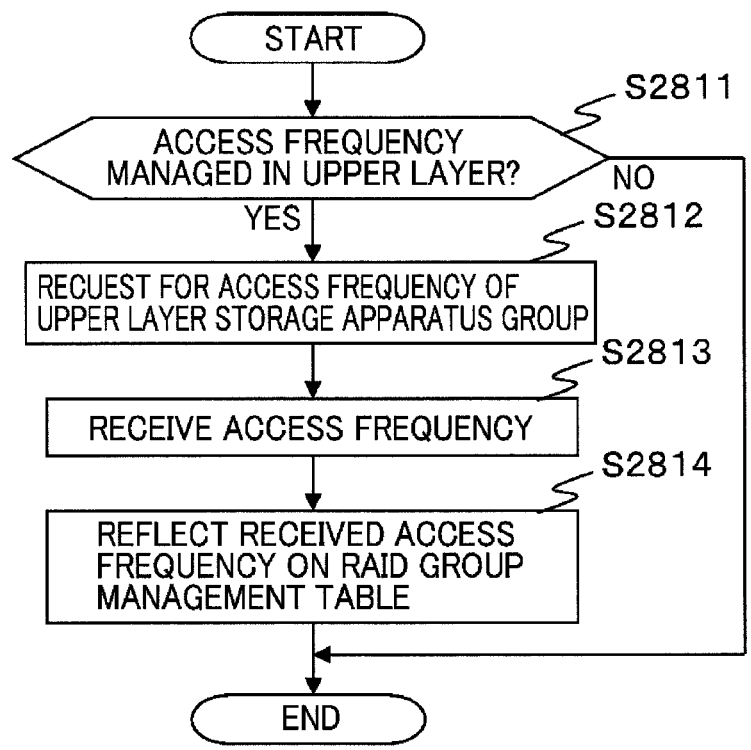
FIG. 28 is a flowchart describing an access frequency acquisition processing S2800.

FIG. 28 is a flowchart describing the processing of acquiring the information equivalent to the information stored in the RAID group management table 1200 from the upper layer storage apparatus group (access frequency in this case) (hereinafter referred to as the access frequency acquisition processing S2800) in the case the above-mentioned power saving structure is applied to a specific storage apparatus 10 belonging to a lower layer storage apparatus group (hereinafter referred to as a lower layer storage apparatus 10). Note that this processing is executed in the lower layer storage apparatus 10, for example, before the host access prioritizing processing S1617 in FIG. 17 is performed or before the power saving prioritizing processing S1618 in FIG. 18 is executed.

Firstly, the lower layer storage apparatus 10 communicates with an upper layer storage apparatus group for performing power saving, and determines whether or not the access frequency of the RAID groups 92 is managed for migration in the upper layer storage apparatus group (S2811). If the access frequency is managed (2811: YES), the process proceeds to S2812 while, if the access frequency is not managed (2811: NO), the processing is completed.

At S2812, the lower layer storage apparatus 10 requests for the access frequency of the upper layer storage apparatus group. At S2813, the lower layer storage apparatus 10 receives the access frequency transmitted from the upper layer storage apparatus group. At S2814, the lower layer storage apparatus 10 sets the received access frequency as the access frequency 1215 of the RAID group management table 1200.

As described above, in the storage system 1 where the operation by the hierarchical storage is performed, the host access prioritizing processing S1617 in FIG. 17 or the power saving prioritizing processing S1618 in FIG. 18 can be executed by utilizing the information retained by the upper layer storage apparatus group for migration, when the power saving structure is applied to a lower layer storage apparatus 10. Therefore, the lower layer storage apparatus 10 does not have to manage the information required for power saving, which can reduce the load on the storage apparatus 10 in performing power saving for the storage apparatus 10.

As described above, in the storage system 1 of the present embodiment, the user can instruct power saving for the storage apparatus 10 by specifying storage pools 93 or virtual volumes 912. Furthermore, when "prioritize host access" is specified, RAID groups 92 as the power saving target are selected preferentially in ascending order of the access frequency from the host computer 30, which enables to achieve power saving of the storage apparatus 10 while suppresses the deterioration of the access performance from the host computer 30.

Meanwhile, when "prioritize power saving" is specified, RAID groups 92 as the power saving target are selected preferentially in descending order of the power consumption, and therefore, a much certain power saving effect can be expected. As above, according to the storage system 1 of the present embodiment, for the power saving methods of the storage apparatus 10, it is possible to respond to the user's needs flexibly, and appropriate power saving of the storage system in accordance with the user's needs can be carried out.

Furthermore, for the user, the RAID group 92 for which the power saving function is operated is automatically selected, only by specifying a storage pool 93 and specifying a power saving mode, so that appropriate power saving of the storage apparatus 10 in accordance with the user's needs can be performed without forcing complicated tasks on the user. Furthermore, as the above-mentioned structure can easily be realized basically by enhancing or installing existing software, no special hardware is required to be installed in the existing storage apparatus 10 or the management device 20, which simplifies the implementation.

Though the preferred embodiments of the present invention has been described above, the above-mentioned embodiments are intended for ease of understanding the present invention and by no means limited to any particular constructions herein disclosed. This invention can also be practiced in various types of other forms.

The invention claimed is:

1. A method of managing power consumption of a storage apparatus, the storage apparatus communicatively coupled to a host computer and a management device, and the storage apparatus comprising: a plurality of storage resources that have a power saving function; one or more storage pools to which one or more of the plurality of storage resources are allocated respectively; and a Thin Provisioning function unit that provides to the host computer a virtual volume provided by the one or more storage pools, the method comprising:

receiving, by the management device, a specification of a power saving target storage pool as a power saving target;

receiving, by the management device, a specification of a power mode, the power mode including any one of a mode of prioritizing host access that emphasizes an access performance of the storage apparatus to the host computer and a mode of prioritizing power saving that prioritizes power saving of the storage apparatus;

when the specification of the mode of prioritizing host access is received, sending, by the management device, to the storage apparatus a first instruction to select the storage resources allocated to the power saving target storage pool in ascending order of an access frequency from the host computer until a sum of a reduced amount of power saving of all the selected storage resources exceeds a target value, and performing, by the storage apparatus, the power saving function of the selected storage resources according to the first instruction; and when the specification of the mode of prioritizing the power saving is received, sending, by the management device, to the storage apparatus a second instruction to select the storage resources allocated to the power saving target storage pool in descending order of power consumption until a sum of a reduced amount of power saving of all the selected storage resources exceeds a target value, and performing, by the storage apparatus, the power saving function of the selected storage resources according to the second instruction.

2. The method according to claim 1, further comprising:
receiving, by the management device, a specification of a power saving level; and
setting, by the management device, the target value according to the received saving level.

3. The method according to claim 1, further comprising:
presenting, by the management device, a specification of the selected storage resources and a total of the power consumption amount;
receiving, by the management device, an indication of whether or not the selected storage resources and the total of the power consumption amount are acceptable to a user; and
providing, by the management device, an instruction to the storage apparatus to perform the power saving function of the selected storage resources, only when the indication received by the management device indicates that the selected storage resources and the total of the power consumption amount are acceptable to the user.

4. The method according to claim 3, wherein when the indication received by the management device indicates that the selected storage resources and the total of the power consumption amount are not acceptable to the user, the method further comprises:
receiving, by the management device, a specification of the storage resources that function under the power saving function; and
providing, by the management device, an instruction to the storage apparatus to perform the power saving function of the specified storage resources that function under the power saving function.

5. The method according to claim 1,
wherein duplication of at least one of the selected storage resources is performed by duplicating a fragment of data of the virtual volume stored in the at least one of the selected storage resources to a respective not-yet selected storage resource of the storage resources allocated to the power saving target storage pool, and the power saving function performs on the at least one of the selected storage resources for which the duplication has been completed, and
wherein when the management device has received the specification of the mode of prioritizing the host access, the power saving function performs on the selected storage resources without performing the duplication.

6. The method according to claim 5,
wherein any one of the selected storage resources is selected when all the storage resources allocated to the power saving target storage pool are selected as a target for performing the power saving function,
wherein the power saving function performs on the one selected storage resource when access is not made to the one selected storage resource from the host computer within a specific length of time,
wherein the power saving function performs on the one selected storage resource when an access is made to the one selected storage resource from the host computer within a specific length of time and the management device has received the specification of the mode of prioritizing the host access, and
wherein the power saving function is stopped on all the storage resources that are already performing under the power saving function, and the power saving target storage pool is restored to an available state when an access is made to the one selected storage resource from the host computer within a specific length of time and the management device has received the specification of the mode of prioritizing the host access.

7. The method according to claim 5, wherein the duplication is performed to each respective not-yet selected storage resource by managing each data amount of the fragment of data of the virtual volumes stored therein, respectively, and making uniform a data amount stored in each respective not-yet selected storage resource based on the data amount.

8. The method according to claim 5, wherein the duplication is performed to each not-yet selected storage resource by managing each access frequency of the fragment of data of the virtual volumes stored therein, respectively, and making uniform an access frequency to each respective not-yet selected storage resource based on the access frequency.

9. The method according to claim 5,
wherein when the management device has received the specification of the mode of prioritizing the host access, the duplication is performed to each respective not-yet selected storage resource by managing each data amount of the fragment of data of the virtual volumes stored therein, respectively, and making uniform a data amount stored in each respective not-yet selected storage resource based on the data amount, or the duplication is performed to each not-yet selected storage resource by managing each access frequency of the fragment of data of the virtual volumes stored therein, respectively, and making uniform an access frequency of each respective not-yet selected storage resource based on the access frequency, and
wherein when the management device has received the specification of the mode of prioritizing the power saving, the duplication to each respective not-yet selected storage resource is performed using a round robin method.

10. The method according to claim 5, further comprising:
monitoring, by the storage apparatus, a used capacity on the power saving target storage pool to which the storage resource performing under the power saving function is allocated;
when the used capacity exceeds a first threshold value, providing, by the storage apparatus, notification to the management device that the used capacity exceeds the first threshold value; and
when the used capacity exceeds a second threshold value, stopping, by the storage apparatus, the power saving function on one or more of the storage resources performing under the power saving function to extend a capacity of the power saving target storage pool.

11. The method according to claim 10, further comprising:
recalculating the used capacity after the power saving function of the storage resources is stopped; and
stopping the power saving function of yet another of the storage resources when the recalculated used capacity exceeds the second threshold value.

12. The method according to claim 5,
wherein the storage apparatus is layered in series to the host computer and is a component of a group of storage apparatuses that perform migration between the storage apparatuses belonging to the same group, and
wherein the storage apparatus is communicatively coupled to another storage apparatus on a side of the host computer rather than on a side of the storage apparatus, acquires information managed by the another storage apparatus for the migration; from the another storage apparatus, and uses an access frequency acquired from the acquired information as the access frequency.

13. The method according to claim 1, wherein the specification of the power saving target storage pool as the power saving target includes specifying a power saving target virtual volume, which is provided by the power saving target storage pool.

14. A storage system comprising:
a host computer;
a management device;
a storage apparatus communicatively coupled to the host computer and the management device,
wherein the storage apparatus comprises:
a plurality of storage resources that have a power saving function;
one or more storage pools to which one or more of the storage resources are allocated respectively; and
a Thin Provisioning function unit that provides to the host computer a virtual volume provided by the one or more storage pools,
wherein the management device comprises:
a computer program; and
a non-transitory computer-readable storage medium having the computer program tangibly embodied thereon, wherein the computer program causes the management device to:
receive a specification of a power saving target storage pool as a power saving target;
receive a specification of a power mode, the power mode including any one of a mode of prioritizing host access that emphasizes an access performance of the storage apparatus to the host computer and a mode of prioritizing power saving that prioritizes power saving of the storage apparatus;
when the specification of the mode of prioritizing host access is received, send to the storage apparatus a first instruction to select the storage resources allocated to the power saving target storage pool in ascending order of access frequency from the host computer until a sum of a reduced amount of power saving of all the selected storage resources exceeds a target value, and cause the storage apparatus to perform the power saving function of the selected storage resources according to the first instruction; and
when the specification of the mode of prioritizing the power saving is received, send to the storage apparatus a second instruction to select the storage resources allocated to the power saving target storage pool in descending order of power consumption until a sum of a reduced amount of power saving of all the selected storage resources exceeds a target value, and cause the storage apparatus to perform the power saving function of the selected storage resource according to the second instruction.

* * * * *